(12) United States Patent
Jagarlapudi

(10) Patent No.: US 8,321,321 B2
(45) Date of Patent: Nov. 27, 2012

(54) ONLINE MARKETPLACE SYSTEM AND METHOD

(75) Inventor: Shastri Seshachala Jagarlapudi, Herndon, VA (US)

(73) Assignee: Metamarket, Inc., Chantilly, VA (US)

( * ) Notice: Subject to any disclaimer, the term of this patent is extended or adjusted under 35 U.S.C. 154(b) by 161 days.

(21) Appl. No.: 12/816,616

(22) Filed: Jun. 16, 2010

(65) Prior Publication Data

US 2011/0313944 A1    Dec. 22, 2011

(51) Int. Cl.
*G06Q 40/00* (2006.01)
(52) U.S. Cl. .................................... 705/36 R
(58) Field of Classification Search ................ 705/36 R
See application file for complete search history.

(56) References Cited

U.S. PATENT DOCUMENTS

| | | | |
|---|---|---|---|
| 5,202,826 A | 4/1993 | McCarthy | |
| 6,134,533 A | 10/2000 | Shell | |
| 6,421,648 B1 | 7/2002 | Gagnon et al. | |
| 2002/0133445 A1 | 9/2002 | Lessin | |
| 2005/0222967 A1 | 10/2005 | Adir | |
| 2008/0270319 A1* | 10/2008 | Torabi et al. | 705/36 R |
| 2011/0258139 A1* | 10/2011 | Steiner | 705/36 R |

FOREIGN PATENT DOCUMENTS

| | | |
|---|---|---|
| KR | 20080008482 | 1/2008 |
| KR | 20100031889 | 3/2010 |

* cited by examiner

*Primary Examiner* — Olabode Akintola
(74) *Attorney, Agent, or Firm* — Standley Law Group LLP

(57) ABSTRACT

A computerized online marketplace that facilitates the acquisition of funding and services for the development and operation of an online business. It provides a variety of investment opportunities for investors and facilitates an entrepreneur's acquisition of capital as well as skills and services needed to start an online business. Possible investment channels for potential investors comprise: money; skills; and services. Investors are awarded investment points for monetary and non-monetary investments and are compensated according to their points. Monetary compensation is awarded periodically to investors according to their rank in relation to the respective investor base of a given business entity. Businesses are hosted at the online marketplace and all aspects of investment and operations are managed through the marketplace thereby facilitating interactions between all parties involved in business initiation, development and operation, including customers.

10 Claims, 6 Drawing Sheets

| Rank | Subscriber | Subscriber IDs | Dynamid Nodes | NPI | NNPI | INPI | -INPI | Penalty | Child Nodes | Def Compensation (after macro justification) | Strategy BHU | Strategy BLD | Strategy BAL | Strategy 50% BHU |
|---|---|---|---|---|---|---|---|---|---|---|---|---|---|---|
| 1 | Sub 1 | 68 | 1, 0, 1 | 8.666666 | 8.666666 | 0.8846154 | 0.3919683 | 0 | 1, 3, 9 | $34.32 | $75.20 | $34.87 | $36.22 | $55.71 |
| 2 | T | 64 | 1, 0, 2 | 2 | 1.9710145 | 0.4926471 | 0.9630027 | 0 | 1, 3, 9 | $34.32 | $75.20 | $34.87 | $36.22 | $55.71 |
| 3 | S | 56 | 2, 1, 1 | 0.5454546 | 0.5296443 | -0.4703557 | -0.2619598 | -0.5 | 1, 3, 8 | $29.68 | $31.62 | $26.60 | $27.41 | $29.51 |
| 4 | Sub 2 | 54 | 2, 2, 1 | 0.8275861 | 0.7916041 | -0.2083959 | -0.465319 | -0.5 | 1, 3, 7 | $27.83 | $30.11 | $25.00 | $25.81 | $27.96 |
| 5 | J | 52 | 2, 1, 2 | 1.4285715 | 1.3457558 | 0.2569231 | 0.9758517 | 1 | 1, 3, 7 | $27.83 | $30.11 | $25.00 | $25.81 | $27.96 |
| 6 | R | 44 | 2, 2, 2 | 0.3030302 | 0.2810715 | -0.7189285 | 0.0105399 | 0 | 1, 3, 7 | $27.83 | $27.68 | $21.08 | $21.89 | $24.78 |
| 7 | Sub 3 | 42 | 2, 1, 3 | 0.2962964 | 0.2705315 | -0.7294685 | -0.0717736 | 0 | 1, 3, 7 | $27.83 | $27.68 | $21.08 | $21.89 | $24.78 |
| 8 | K | 40 | 2, 2, 3 | 0.3809526 | 0.3423052 | -0.6576948 | -0.9305288 | -1 | 1, 3, 7 | $27.83 | $20.29 | $15.08 | $15.89 | $18.09 |
| 9 | N | 40 | 3, 1, 1 | 1.5555559 | 1.3752017 | 0.2728339 | 0.1764055 | 0 | 1, 3, 7 | $12.99 | $13.60 | $14.63 | $14.89 | $14.25 |
| 10 | Sub 4 | 38 | 3, 4, 1 | 1.2727271 | 1.1067193 | 0.0964285 | 0.9164134 | 1 | 1, 3, 0 | $12.99 | $13.60 | $14.63 | $14.89 | $14.25 |
| 11 | Sub 5 | 34 | 3, 2, 1 | 0.2105262 | 0.1800151 | -0.8199849 | -0.2079449 | -0.5 | 1, 3, 0 | $12.99 | $7.53 | $8.67 | $8.93 | $8.23 |
| 12 | Sub 6 | 34 | 3, 5, 1 | 0.4615386 | 0.38796 | -0.61204 | 0.3573642 | 0.5 | 1, 3, 0 | $12.99 | $7.53 | $8.67 | $8.93 | $8.23 |
| 13 | M | 32 | 3, 3, 1 | 0.037037 | 0.0305958 | -0.9694042 | 0.0005367 | 0 | 1, 3, 0 | $12.99 | $7.53 | $8.67 | $8.93 | $8.23 |
| 14 | Q | 32 | 3, 6, 1 | 0.037037 | 0.030059 | -0.969941 | -0.9264619 | -1 | 1, 3, 0 | $12.99 | $7.53 | $8.67 | $8.93 | $8.23 |
| 15 | V | 32 | 3, 1, 2 | 1.1999991 | 0.956521 | -0.043479 | -0.8038957 | -1 | 1, 3, 0 | $12.99 | $7.53 | $8.67 | $8.93 | $8.23 |
| 16 | Sub 7 | 32 | 3, 4, 2 | 5.333334 | 4.1739135 | 0.7604167 | -0.0893656 | 0 | 1, 3, 0 | $12.99 | $7.53 | $8.67 | $8.93 | $8.23 |
| 17 | Sub 8 | 32 | 3, 2, 2 | 8.666666 | 6.6570044 | 0.8497823 | 1.4191405 | 1.5 | 1, 2, 0 | $10.20 | $7.53 | $8.67 | $8.93 | $8.23 |
| 18 | Sub 9 | 26 | 3, 5, 2 | 0.5714286 | 0.4306418 | -0.5693582 | 0.3758915 | 0.5 | 1, 2, 0 | $10.20 | $7.53 | $8.67 | $8.93 | $8.23 |
| 19 | Sub 10 | 22 | 3, 3, 2 | 0.074074 | 0.0547503 | -0.9452497 | -0.1157528 | 0 | 1, 2, 0 | $10.20 | $7.53 | $8.67 | $8.93 | $8.23 |
| 20 | Sub 11 | 22 | 3, 6, 2 | 0.2352943 | 0.1705031 | -0.8294969 | -0.4381924 | -0.5 | 1, 2, 0 | $10.20 | $7.53 | $8.67 | $8.93 | $8.23 |
| 21 | Sub 12 | 22 | 3, 1, 3 | 0.8571426 | 0.6086955 | -0.3913045 | 0.5829306 | 1 | 1, 2, 0 | $10.20 | $7.53 | $8.67 | $8.93 | $8.23 |
| 22 | L | 20 | 3, 4, 3 | 0.037037 | 0.0257649 | -0.9742351 | 0.0005368 | 0 | 1, 2, 0 | $10.20 | $7.53 | $8.67 | $8.93 | $8.23 |
| 23 | O | 20 | 3, 2, 3 | 0.037037 | 0.0252281 | -0.9747719 | 0.0005367 | 0 | 1, 2, 0 | $10.20 | $7.53 | $8.67 | $8.93 | $8.23 |
| 24 | P | 20 | 3, 5, 3 | 0.037037 | 0.0246913 | -0.9753087 | 0.0005368 | 0 | 1, 2, 0 | $10.20 | $7.53 | $8.67 | $8.93 | $8.23 |
| 25 | U | 20 | 3, 3, 3 | 0.037037 | 0.0241546 | -0.9758455 | 0.0005368 | 0 | 1, 2, 0 | $10.20 | $7.53 | $8.67 | $8.93 | $8.23 |
| 26 | W | 20 | 3, 6, 3 | 0.037037 | 0.0236178 | -0.9763822 | 0.0005368 | 0 | 1, 2, 0 | $10.20 | $7.53 | $8.67 | $8.93 | $8.23 |
| 27 | X | 20 | 3, 1, 1 | 0.037037 | 0.023081 | -0.976919 | 0.0005367 | 0 | 1 | $7.42 | $6.03 | $8.22 | $7.93 | $6.98 |
| 28 | Y | 20 | 4, 10, 1 | 0.037037 | 0.0225443 | -0.9774557 | 0.0005368 | 0 | 1 | $6.03 | $5.33 | $7.52 | $7.24 | $6.28 |
| 29 | Sub 13 | 20 | 4, 4, 1 | 0.037037 | 0.0220075 | -0.9779925 | 0.0005367 | 0 | 1 | $4.99 | $4.99 | $7.17 | $6.89 | $5.94 |
| 30 | Sub 14 | 20 | 4, 13, 1 | 0.037037 | 0.0214707 | -0.9785293 | 0.0005367 | 0 | 1 | $4.81 | $4.81 | $7.00 | $6.71 | $5.76 |

| Rank | Subscriber | Subscriber IPs | Dynamid Nodes | NPI | NNPI | TNPI | -TNPI | Penalty | Child Nodes | Def Compensation (after macro justification) | Strategy BHU | Strategy BLD | Strategy BAL | Strategy 50% BHU |
|---|---|---|---|---|---|---|---|---|---|---|---|---|---|---|
| 31 | Sub 15 | 20 | 4, 7, 1 | 0.037037 | 0.020934 | -0.979066 | 0.0005368 | 0 | 1 | $4.72 | $4.72 | $6.91 | $6.63 | $5.68 |
| 32 | Sub 16 | 20 | 4, 16, 1 | 0.037037 | 0.0203972 | -0.9796028 | 0.0005367 | 0 | 1 | $4.68 | $4.68 | $6.87 | $6.58 | $5.63 |
| 33 | Sub 17 | 20 | 4, 2, 1 | 0.037037 | 0.0198604 | -0.9801396 | 0.0005368 | 0 | 1 | $4.66 | $4.66 | $6.85 | $6.56 | $5.61 |
| 34 | Sub 18 | 20 | 4, 11, 1 | 0.037037 | 0.0193237 | -0.9806764 | 0.0005367 | 0 | 1 | $4.65 | $4.65 | $6.84 | $6.55 | $5.60 |
| 35 | Sub 19 | 20 | 4, 5, 1 | 0.037037 | 0.0187869 | -0.9812131 | 0.0005368 | 0 | 1 | $4.64 | $4.64 | $6.83 | $6.55 | $5.59 |
| 36 | Sub 20 | 20 | 4, 14, 1 | 0.037037 | 0.0182501 | -0.9817499 | 0.0005367 | 0 | 1 | $4.64 | $4.64 | $6.83 | $6.54 | $5.59 |
| 37 | Sub 21 | 20 | 4, 8, 1 | 0.037037 | 0.0177133 | -0.9822866 | 0.0005368 | 0 | 1 | $4.64 | $4.64 | $6.83 | $6.54 | $5.59 |
| 38 | Sub 22 | 20 | 4, 17, 1 | 0.037037 | 0.0171766 | -0.9828234 | 0.0005367 | 0 | 1 | $4.64 | $4.64 | $6.83 | $6.54 | $5.59 |
| 39 | Sub 23 | 20 | 4, 3, 1 | 0.037037 | 0.0166398 | -0.9833602 | 0.0005368 | 0 | 1 | $4.64 | $4.64 | $6.83 | $6.54 | $5.59 |
| 40 | Sub 24 | 20 | 4, 12, 1 | 0.037037 | 0.016103 | -0.983897 | -0.5442837 | -1 | 1 | $4.64 | $3.71 | $5.90 | $5.61 | $4.66 |
| 41 | Sub 25 | 20 | 4, 6, 1 | 1.333334 | 0.5603868 | -0.4396132 | -0.5155059 | -1 | 1 | $4.64 | $3.71 | $5.90 | $5.61 | $4.66 |
| 42 | Sub 26 | 20 | 4, 15, 1 | 2.666666 | 1.0821253 | 0.0758926 | -0.2852185 | -0.5 | 1 | $4.64 | $3.71 | $5.90 | $5.61 | $4.66 |
| 43 | Sub 27 | 20 | 4, 9, 1 | 4 | 1.5652174 | 0.3611111 | 1.3471551 | 1.5 | 1 | $4.64 | $3.71 | $5.90 | $5.61 | $4.66 |
| 44 | Sub 28 | 16 | 4, 18, 1 | 0.037037 | 0.013956 | -0.986044 | -0.1836725 | -0.5 | 1 | $4.64 | $3.71 | $5.90 | $5.61 | $4.66 |
| 45 | Sub 29 | 16 | 4, 1, 2 | 0.5454546 | 0.1976285 | -0.8023715 | -0.3986446 | -1 | 1 | $4.64 | $3.71 | $5.90 | $5.61 | $4.66 |
| 46 | Sub 30 | 16 | 4, 10, 2 | 1.7142853 | 0.5962731 | -0.4037269 | -0.9037269 | -1 | 1 | $4.64 | $3.71 | $5.90 | $5.61 | $4.66 |
| 47 | Sub 31 | 16 | 4, 4, 2 | 6 | 2 | 0.5 | 1.4881911 | 1.5 | 1 | $4.64 | $3.71 | $5.90 | $5.61 | $4.66 |
| 48 | Sub 32 | 10 | 4, 13, 2 | 0.037037 | 0.0118089 | -0.9881911 | 0.0005367 | 0 | 1 | $4.64 | $3.71 | $5.90 | $5.61 | $4.66 |
| 49 | Sub 33 | 10 | 4, 7, 2 | 0.037037 | 0.0112721 | -0.9887279 | 0.0005367 | 0 | 1 | $4.64 | $3.71 | $5.90 | $5.61 | $4.66 |
| 50 | Sub 34 | 10 | 4, 16, 2 | 0.037037 | 0.0107354 | -0.9892646 | 0.0005368 | 0 | 1 | $4.64 | $3.71 | $5.90 | $5.61 | $4.66 |
| 51 | Sub 35 | 10 | 4, 2, 2 | 0.037037 | 0.0101986 | -0.9898014 | 0.0005367 | 0 | 1 | $4.64 | $3.71 | $5.90 | $5.61 | $4.66 |
| 52 | Sub 36 | 10 | 4, 11, 2 | 0.037037 | 0.0096618 | -0.9903381 | 0.0005368 | 0 | 1 | $4.64 | $3.71 | $5.90 | $5.61 | $4.66 |
| 53 | Sub 37 | 10 | 4, 5, 2 | 0.037037 | 0.0091251 | -0.9908749 | 0.0005367 | 0 | 1 | $4.64 | $3.71 | $5.90 | $5.61 | $4.66 |
| 54 | Sub 38 | 10 | 4, 14, 2 | 0.037037 | 0.0085883 | -0.9914117 | 0.0005368 | 0 | 1 | $4.64 | $3.71 | $5.90 | $5.61 | $4.66 |
| 55 | Sub 39 | 10 | 4, 8, 2 | 0.037037 | 0.0080515 | -0.9919485 | 0.0005367 | 0 | 1 | $4.64 | $3.71 | $5.90 | $5.61 | $4.66 |
| 56 | Sub 40 | 10 | 4, 17, 2 | 0.037037 | 0.0075148 | -0.9924852 | 0.0005368 | 0 | 1 | $4.64 | $3.71 | $5.90 | $5.61 | $4.66 |
| 57 | Sub 41 | 10 | 4, 3, 2 | 0.037037 | 0.006978 | -0.993022 | 0.0005367 | 0 | 1 | $4.64 | $3.71 | $5.90 | $5.61 | $4.66 |
| 58 | Sub 42 | 10 | 4, 12, 2 | 0.037037 | 0.0064412 | -0.9935588 | 0.0005368 | 0 | 1 | $4.64 | $3.71 | $5.90 | $5.61 | $4.66 |
| 59 | Sub 43 | 10 | 4, 6, 2 | 0.037037 | 0.0059044 | -0.9940956 | 0.0005367 | 0 | 1 | $4.64 | $3.71 | $5.90 | $5.61 | $4.66 |
| 60 | Sub 44 | 10 | 4, 15, 2 | 0.037037 | 0.0053677 | -0.9946323 | 0.0005368 | 0 | 1 | $4.64 | $3.71 | $5.90 | $5.61 | $4.66 |

| Rank | Subscriber | Subscriber IPs | Dynamid Nodes | | NPI | NNPI | TNPI | -TNPI | Penalty | Child Nodes | Def Compensation (after macro justification) | Strategy BHU | Strategy BLD | Strategy BAL | Strategy 50% BHU |
|---|---|---|---|---|---|---|---|---|---|---|---|---|---|---|---|
| 61 | Sub 45 | 10 | [4, 9, 2] | | 0.037037 | 0.0048309 | −0.9951691 | 0.0005367 | 0 | 1 | $4.64 | $3.71 | $5.90 | $5.61 | $4.66 |
| 62 | Sub 46 | 10 | [4, 18, 2] | | 0.037037 | 0.0042941 | −0.9957058 | 0.0005368 | 0 | 1 | $4.64 | $3.71 | $5.90 | $5.61 | $4.66 |
| 63 | Sub 47 | 10 | [4, 1, 3] | | 0.037037 | 0.0037574 | −0.9962426 | 0.0005367 | 0 | 1 | $4.64 | $3.71 | $5.90 | $5.61 | $4.66 |
| 64 | Sub 48 | 10 | [4, 10, 3] | | 0.037037 | 0.0032206 | −0.9967794 | 0.0005368 | 0 | 1 | $4.64 | $3.71 | $5.90 | $5.61 | $4.66 |
| 65 | Sub 49 | 10 | [4, 4, 3] | | 0.037037 | 0.0026838 | −0.9973162 | 0.0005367 | 0 | 1 | $4.64 | $3.71 | $5.90 | $5.61 | $4.66 |
| 66 | Sub 50 | 10 | [4, 13, 3] | | 0.037037 | 0.0021471 | −0.9978529 | 0.0005368 | 0 | 1 | $4.64 | $3.71 | $5.90 | $5.61 | $4.66 |
| 67 | Sub 51 | 10 | [4, 7, 3] | | 0.037037 | 0.0016103 | −0.9983897 | 0.0005367 | 0 | 1 | $4.64 | $3.71 | $5.90 | $5.61 | $4.66 |
| 68 | Sub 52 | 10 | [4, 16, 3] | | 0.037037 | 0.0010735 | −0.9989265 | 0.0005368 | 0 | 1 | $4.64 | $3.71 | $5.90 | $5.61 | $4.66 |
| 69 | Sub 53 | 10 | [4, 2, 3] | | 0.037037 | 0.0005368 | −0.9994633 | 0.0005368 | 0 | 1 | $4.64 | $3.71 | $5.90 | $5.61 | $4.66 |

FIG-2D

ONLINE MARKETPLACE SYSTEM AND METHOD

CROSS-REFERENCES TO RELATED APPLICATIONS

None.

FIELD OF THE INVENTION

The present invention relates generally to computerized systems and methods for developing and operating an online business. In particular, the present invention relates to a computerized online marketplace system and method that facilitates the acquisition of funding and services (equity) in addition to certain essential services to online business entities (proxy-equity) for the development and operation of an online business. The invention also relates to a method of compensation distribution to both equity and proxy-equity investors in a Multi-Level Marketing (MLM) like fashion.

BACKGROUND OF THE INVENTION

The requirements for starting an e-commerce business are numerous. Raising capital is one of the most important concerns for any startup business, including an e-commerce business. In the case of online e-commerce businesses, which are typically individual-owned, the requirements extend beyond merely obtaining capital. The business may further require technology skills to host a website, internet advertising and marketing skills to sustain business growth, logistics and fulfillment skills to serve customer needs, etc. Websites such as eBay® serve as facilitators in this respect by providing for a nominal fee the necessary software and payment infrastructure, customer review/feedback infrastructure, and potential customer base to aspiring e-commerce entrepreneurs. However, there are certain critical aspects of business operations that these websites fail to provide such as shown in Table 1.

TABLE 1

| Unmet Requirements to Initiate and Operate an Online Business |
|---|
| 1. A business plan that defines the products and/or services to be sold; existing websites do not provide business plans to their subscribers (who are interested in investing but not sure what to sell) |
| 2. Capital for procuring products and/or developing services to be sold; existing websites do not provide capital to implement business plans of their subscribers (who know what to sell but lack capital) |
| 3. E-commerce business know-how including experience and skill in describing and listing the products, receiving and fulfilling orders, providing customer service, etc.; existing websites do not provide online business know-how to subscribers (who do not know how to sell) |
| 4. Identification and acquisition of customer base for a given product prior to launching the business and getting market noticiability; while existing sites offer 'potential' customers, none of these can assure a 'confirmed' customer base before business launch to their subscribers (who have all that it takes to start an online business but are skeptic about its success) |

While there are several organized avenues such as angel investor and venture capital networks that facilitate business initiation and operation by matching investors and entrepreneurs, these do not fit the requirement of starting an e-commerce business for a variety of reasons such as the scale in which they operate, additional requirements of an e-commerce business and the very nature of e-commerce businesses, etc. For this reason, e-commerce entrepreneurs often turn to family members or friends to provide capital or to acquaintances of family members and friends. Although there are opportunities for various parties equipped with different skills and resources to benefit from a mutual business relationship, there are limited opportunities for them to find each other. There is a need for a computerized system and method:

a) that facilitates the process of starting and operating an online business by matching various parties equipped with different skills and resources;

b) that assists an entrepreneur with a business plan or an investor with resources in completing a variety of activities and tasks related to starting an online business;

c) that supports the location and engagement of individuals and other service providers that can assist the business initiator in starting an online business;

d) that facilitates the acquisition of funding and services for the development and operation of an online business; and e) that compensates parties according to their contributions to an online business and that facilitates the distribution of compensation.

Customers have always been considered external entities to the business (e-commerce or otherwise) itself though their contribution to the business success, just by being who they are—customers—is not trivial. The concept of Multi-Level Marketing (MLM) addresses this concern to an extent by making customers stakeholders in business success but, of course, this comes with a rigid set of rules by MLM participants. While there are several inventions in the field of MLM, all of these are aimed at addressing concerns of the companies that adopt MLM approach in terms of sustaining consumer motivation to participate in the program or providing near equal opportunity to all the consumers etc. The rules aspect of MLM from a customer perspective is an under researched field, if not untouched.

With the tremendous advancement of computer and internet technologies and profound penetration of the personal computer in today's world, there are several ways an average online consumer could provide value additions to online business entities they are interested in and get compensated in return. At the same time and for the same reason, one of the major challenges faced by online business entities is 'noticiability' on internet. At present, there is no consistent platform that brings both businesses and consumers to the table and lets consumers fully tap the advantages offered by technological advancements while filling in the requirement of businesses to acquire market noticiability.

Thus, there is also a need for a computerized online marketplace a) that is consumer-centric where subscribers/customers are provided the flexibility to choose how to participate in an MLM-like program;

b) that integrates business customers with the process of business initiation and operation;

c) that acts as a neutral platform for online businesses and their customers to interact for mutual benefit;

d) that enables online businesses to induce their customers to provide required inputs for business growth as well as lets the customers provide these inputs; and e) that has the capability of aggregating the individual customer investments for the benefit of the businesses and has a method in place to compensate the customers for their investments.

SUMMARY OF THE INVENTION

The present invention is a computerized online marketplace that facilitates the acquisition of funding and services for the development and operation of an online business. The online marketplace provides a variety of investment opportunities for subscribers of the marketplace and facilitates business initiator's acquisition of resources as well as skills and services needed to start and operate an online business. In addition, the marketplace also attracts services from prospective business customers that are specific to online businesses, referred to as proxy-equity, which in itself is the purpose of the invention.

The online marketplace operates both as a primary (stock) market for business startups on the marketplace and a secondary (stock) market for existing businesses on the marketplace or elsewhere (which have a proxy store on the marketplace). However, the stakes traded in case of the marketplace could either be equity or proxy-equity stakes. 'Collaborative business ownership' feature of the online marketplace works similar to a primary stock market (which deals with the issuance of new equity securities to raise capital) for businesses started on the marketplace, not just in terms of raising the necessary capital but also in providing the other key requirements for an online ecommerce business such as a business plan, know-how, 'confirmed' customer base, etc. For existing businesses, the marketplace is a platform that enables proxy-equity trading and settlements, analogous to the way a secondary stock market functions.

Possible investment types on the online marketplace are broadly placed under three categories: money; skills; and services (time and effort). Different investment types are quantified on the marketplace using a common scale of Investment Points (IPs). For a given business enterprise on the marketplace, business initiators or owners associate certain number of Investment Points (IPs) to various actions possible by subscribers on the marketplace that serve the objectives of the business in question. Algorithms that govern association of IP value to subscriber actions are abstracted by marketplace business framework that directly interfaces with the end users. Subscribers then make equity or proxy-equity investments in terms of the three investment categories: money; skills; or services (time and effort) by performing the actions to get compensated with respective number of IPs. Finally, at the end of each pre-determined business cycle, equity/proxy-equity settlements are made. IPs are converted to cash equivalent using an algorithm called 'Dynamid algorithm' on the marketplace.

With wide varieties of investment options possible on the marketplace, subscribers are free to choose the way they contribute to the business entity in question and get compensated. Thus the marketplace not only is a platform for floating online e-commerce businesses but also enables consumers to own their individual cash generating businesses where in the investment is in terms of proxy-equity towards various listed online businesses on the marketplace. Such consumer owned businesses on the marketplace are referred to as Meta-Businesses. Empowering consumers to own Meta-Businesses is one of the main objectives of the system and method.

Online e-commerce businesses are listed as business-proxies on the marketplace. Each business-proxy listed corresponds to a 'real' online business—either an existing one or one intended to be initiated on the marketplace.

The computerized online marketplace facilitates multiple levels of interaction between various participants in the marketplace. In an example embodiment, interactions are achieved by way of social networking. Most important among these are subscriber-subscriber interaction, subscriber-subscriber community interaction, and subscriber-business proxy interaction, thus enabling easier location and engagement of individual service providers and proxy service providers for business inception and operation on the marketplace. This also lets businesses to interact with consumers for mutual benefit.

BRIEF DESCRIPTION OF THE DRAWINGS

FIGS. 2A-2D illustrate a compensation distribution process (Dynamid algorithm) according to the invention.

DETAILED DESCRIPTION OF EXAMPLE EMBODIMENT(S)

Figure 1:
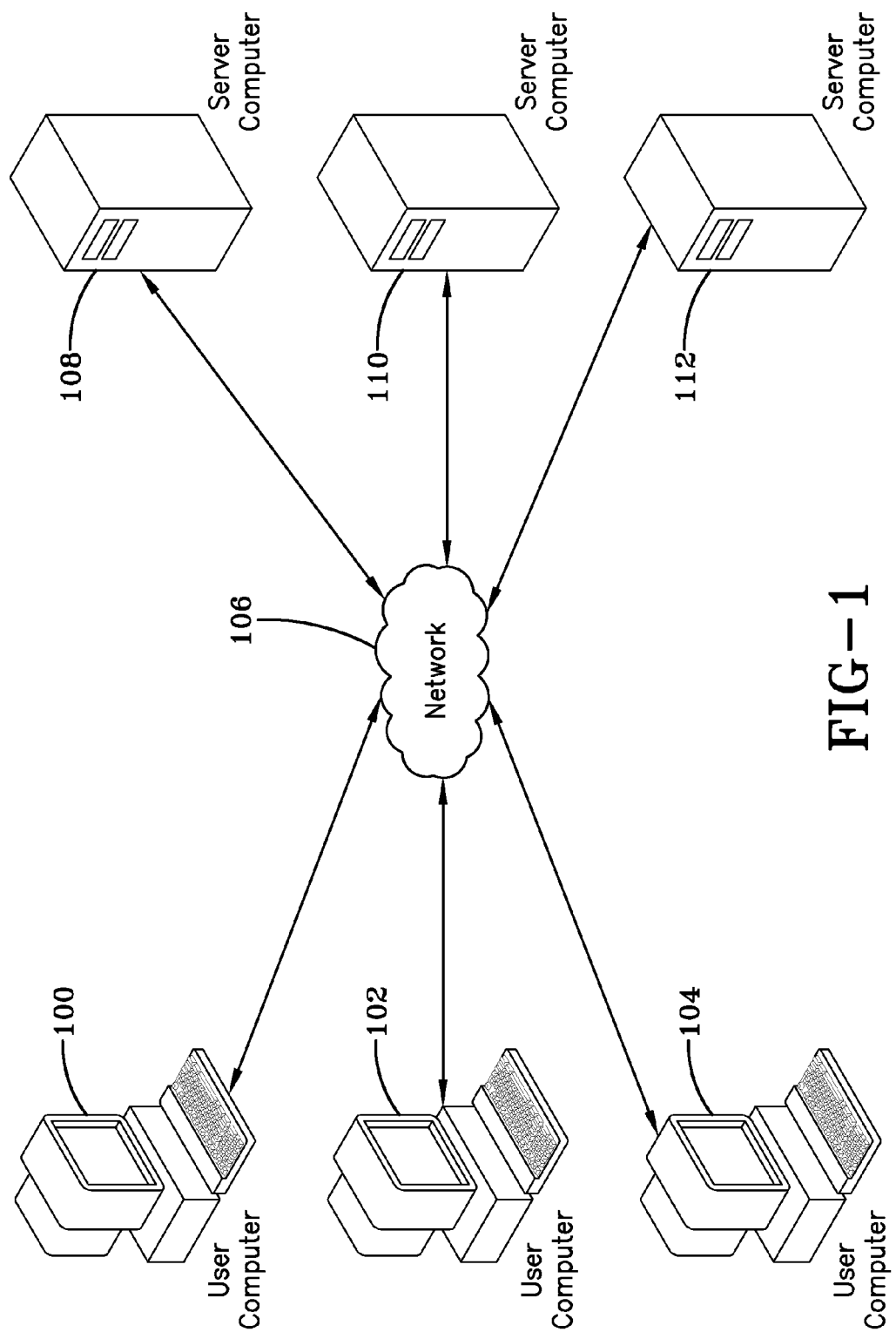
FIG. 1 is a diagrammatic view of a computerized system according to the invention.

Referring to FIG. 1, a diagrammatic view of a computerized system according to the invention is shown. One or more server computers 108, 110, 112 accessible via the Internet 106 support user computer 100, 102, 104 interactions with in online marketplace. Various applications and algorithms executed at the servers provide features and functionality to enable various marketplace specific actions by the subscribers—both customers and online businesses—in realizing the concepts of 'proxy equity' and 'Dynamid'. Example embodiments of the invention also include social networking components to enable interaction between the subscribers.

In an example embodiment of the invention, the online marketplace is implemented as a social networking website that serves as a platform where product (or service) providers/suppliers and consumers interact in a way that is mutually beneficial. From the point of view of suppliers (e.g., manufacturers, distributors, retailers or multi-level marketers), the online marketplace is a business sales channel. For businesses that are started on the online marketplace, it also serves as a primary market where public investment (not necessarily monetary) may be sought. From the point of view of consumers, the online marketplace is a stock market of business opportunities—with each business or supplier listed on the marketplace representing an opportunity for consumers. For consumers, it further operates as a social network to interface with fellow consumers or suppliers and as a business portal, where consumer-specific businesses (meta-businesses) may be established.

From the point of view of the marketplace, more consumers imply more suppliers and hence more business on the marketplace. Search engine optimization (SEO) and social networking functionality provide the paths to acquire and retain a supplier and consumer base. The online marketplace with its suppliers and consumers may be viewed as an aggregation of abstracted multi-level marketing (MLM) entities called Dynamids on the marketplace (analogous to MLM businesses being abstracted as pyramids).

Business Model

The online marketplace leverages on the power of building collaborative on-line business communities to offer flexibility and ease to its subscribers in owning profitable businesses—e-commerce businesses as well as meta-businesses. As a result, an aspiring entrepreneur (or a consumer wanting to establish his or her own money generating meta-business) may focus on the business aspect of his or her interest or capabilities while the business model of the marketplace augments the rest. True potential of the business model lies in the flexibility it offers to its subscribers in terms of the investment types—or actions performed by subscribers on the website.

Subscriber actions are considered investment types and awarded through the marketplace.

Glossary of Terms

The following is a list of terms/components used in explaining how the marketplace business model is accomplished—

A) Online Marketplace Subscribers—Any person or organization registered with online marketplace is considered a subscriber. Subscribers may be product or service sellers and consumers. Subscribers may participate in multiple roles at a time.

B) Investment Channels & Types—Subscribers of the marketplace are provided with a wide variety of investment options which may be classified into three categories—Money, Skill, and Services (Time and Effort). These categories are referred to as investment channels on the marketplace. Particular subscriber actions that fall in each category are called investment types (ITs) or contribution types.

C) Investment Points—Quantization of investment type actions on the marketplace is achieved through investment points (IPs). All possible subscriber actions that benefit business entities on the marketplace are associated with certain number of IPs as per the discretion of the business entity owner/s. When subscribers perform the action, they are awarded corresponding investment points (IPs).

D) Business-Proxy and Policy-Set—Online businesses are listed on the marketplace as Business Proxies. Business proxy is analogous to 'listed company' on a stock market. Business proxies on the marketplace are either created explicitly by business promoters or are implied in case business transactions are enabled on the marketplace for businesses with no registered proxy on marketplace.

Business proxy, as the name suggests, is quite separate from the business it corresponds to in terms of business operations and is meant to encapsulate objectives of the online business on the marketplace. This is accomplished by way of formulating a proxy policy-set that details several aspects like permissible investment types, IT-IP mapping and IP settlement (Dynamid) details etc.

E) Business Platform—Subscribers of the marketplace collaborate with hosted proxies and fellow subscribers on an abstract staging platform, which is the marketplace business platform. This is analogous to 'trading ring' of a stock market. Marketplace primary and secondary market activities are published and conducted here.

F) Meta-Business—Default businesses owned by subscribers on the marketplace are called meta-businesses. Subscribers invest in their meta-businesses by way of performing permissible actions of listed proxies on the marketplace, earn IPs and finally get compensated through IP settlement. Key components of a meta-business are 1) proxy portfolio; 2) investment channels/types; and 3) investment points.

G) Proxy-Equity—Proxy ownership interest in an online enterprise in the form of Investment Points (IPs) on the marketplace. It also refers to such intangible assets of an online entity as visibility on the Internet, potential to continually acquire customers, confirmed customer base in case of a startup etc., that are exchanged against IPs on the marketplace.

H) Business Cycle—Duration between two successive subscriber compensation settlements using Dynamid algorithm is considered business cycle of the respective business proxy.

I) Dynamid—IP settlement is accomplished on the marketplace using Dynamid algorithm. Dynamid is a dynamic pyramid.

On the marketplace, for a given business proxy in a given business cycle, all the subscribers holding proxy equity (in the form of IPs) are dynamically positioned into a pyramid structure and a payback component is determined for each subscriber. Dynamids are dismantled once compensations are calculated and built from scratch for subsequent business cycles.

A Dynamid differs from a classical MLM pyramid in a number of ways, thus addressing several consumer concerns in a typical MLM scenario.

Collaborative Business Ownership

This feature lets a subset of subscriber base of the marketplace to get together and initiate a business enterprise. It also integrates potential customers into the process of business initiation using the concepts of proxy-equity and Dynamid, thus provides several advantages to all parties involved.

Collaborative business ownership feature of the online marketplace works similar to primary stock market and is realized by what is called an Investment Point Offering (IPO) on the marketplace. Skill to develop a business plan for an online business is considered primary investment type; any subscriber with this skill could initiate an IPO session on the marketplace. Other requirements for the business such as monetary and service inputs, associated skill requirements are case dependent and are defined by primary investors, before initiating IPO session. Alternately, monetary investors may initiate a pre-IPO session, the end state of which typically launches an IPO on the marketplace.

Initiators of an IPO session on the marketplace have an option to float equity or proxy equity shares or both, based on the perceived requirement. Marketplace subscribers may then bid for either of the share types based on the chosen investment type. Direct or indirect monetary investment types in addition to primary investment type attract equity stakes while consumer specific investment types typically fetch proxy equity stakes in an IPO session. Investment types that attract proxy equity may include activities such as writing a review, providing direct or indirect referrals, blogging on related topics, providing uni/bi-directional links to the online entity or being a customer.

Use-Case View of IPO Scenario on the Marketplace—Collaborative Business Ownership Explained The use-case view provides a description of end-to-end user actions and interactions with co-actors that span the following three phases of collaborative business ownership feature on the marketplace:

TABLE 2

Phases of Collaborative Business Ownership Feature

| | |
|---|---|
| 1. | Pre-IPO; |
| 2. | IPO; and |
| 3. | Post-IPO. |

TABLE 3

Actors in Collaborative Business Ownership Scenario

| Actor | Description |
|---|---|
| Online Marketplace Angels | Subscribers of online marketplace interested in direct monetary investment. |
| Online Marketplace Entrepreneurs | Primary skill investors in the online marketplace; business plan owners. |

TABLE 3-continued

Actors in Collaborative Business Ownership Scenario

| Actor | Description |
| --- | --- |
| Skill Investors | Associated skill or service providers who may also be indirect monetary investors in an IPO phase. |
| Primary Investors | Online marketplace Angel or Entrepreneur or both, whoever is instrumental in launching IPO or Pre-IPO session. |
| Secondary Investors | Angel, associated skill investor or provider, or services investor |
| Proxy Equity Investors | Bidders of proxy equity; predominantly time and effort investors, a subset of which are confirmed customers. |

Each of the following subsections detail the three phases depicted in Table 2. A fictitious case study is also given at the end of each step as an example to help correlate with the event/action flow.

Pre-IPO Phase of Collaborative Business Ownership Feature

This phase is optional and may precede an IPO phase where online marketplace angels call for business plans from the subscriber base of the marketplace based on set criteria that define the angel's investment objectives.

Steps involved in this phase include:

1. Initiate pre-IPO session;
2. Receive proposals (from Angel's perspective) and evaluate;
3. Send counter-proposals to business plan owner/s and finalize partnership details; and
4. Initiate IPO phase Pre-IPO STEP I: Initiation (Actor—Marketplace Angel)

Angels initiate pre-IPO sessions on the marketplace by providing various details (shown in Table 4) that reflect their investment objectives. Online marketplace provides necessary screens to capture these details.

Case Study—Pre-IPO: STEP I

Angel A, who is a registered user of the online marketplace, initiates a pre-IPO session on Oct. 1, 2010 with the details shown in Table 4.

TABLE 4

Pre-IPO Session Details

| No. | Pre-IPO Details | Case study details |
| --- | --- | --- |
| 1 | Monetary investment limit | $2000 |
| 2 | Business type/s interested in | Online ecommerce business preferably dealing with niche artistic products |
| 3 | Pre-IPO session window | 10 days |
| 4 | Whether interested in sharing business with other angels, if the required monetary investment for selected business plan exceeds Angel's investment | Yes |
| 5 | Whether interested in splitting the investment if more than one business plans look appealing | No |
| 6 | Whether expects any mandatory monetary investment from business plan owners | Yes |
| 7 | If answer for Q6. is 'Yes', threshold percent | 50% (meaning expects at least $1000 from business plan owner) |

Pre-IPO STEP II: Receive Proposals and Evaluate (Actors—Angel & Entrepreneurs)

Pre-IPO details are published on the marketplace business platform and subscribers are notified of it based on a push or pull mechanism as per their set preference. Interested investors may respond by providing business plan details. The angel evaluates the business plans submitted by entrepreneurs.

Case Study—Pre-IPO: STEP II

By Oct. 10, 2010 angel A receives four proposals that he evaluates and shortlists two business plans.

Pre-IPO STEP III: Send Counter-proposals to Business Plan Owners (Actors—Angel & Entrepreneurs)

The marketplace, with its social networking features, enables multiple ways of interaction between angels and entrepreneurs. Proposal and counter-proposal exchanges between the angel and the entrepreneur/s are expected to finalize the details shown in Tables 5, 6, 7A and 7B, in preparation for the further phases of business inception. The marketplace helps business initiators by providing necessary screens to capture and exchange these details. Most of the IPO details (Table 7A & 7B) constitute the policy-set for the proposed business proxy.

Case Study—Pre-IPO: STEP III

Understanding between angel A and one of the two entrepreneurs (B) on Oct. 20, 2010 constitutes the details depicted in Tables 5, 6, 7A and 7B.

TABLE 5

Business Details

| Pre-IPO Details | Case study details |
| --- | --- |
| Business Name: | A&B Inc. |
| Product/s: | Product-A (Category - Christmas Gifts) |
| Product details: | Weight - 200 g, Size - 12" × 12" × 4", Photo etc. |
| Cost price per unit: | $50 |
| Proposed selling price (post-IPO): | $80 + Shipping |
| Selling strategy: | Direct sale/(Auction) |
| Why would the product sell for the projected price? | (Optional, for the benefit of the angel and any future investors) |
| Market research summary: | (Optional, for the benefit of the angel and any future investors) |
| Projected total initial investment: | $5000 + $800 (projected shipping estimate) |
| Associated services that may be required: | Shipping |
| Target Customer Demography: | US |
| Business span: | Possible long-term (i.e., Contract extendible) |

TABLE 6

Partnership Details

| Pre-IPO Details | Case Study Details |
| --- | --- |
| Business Plan Owner's Monetary investment: | $1000 |
| Monetary equivalent of the business plan: | $333.34 → 60-40 profit split between angel and entrepreneur |
| Equity dilution model during IPO phase: | Uniform |
| Agreement expiration date/criteria: | Sale of 100 Nos. of Product-A |
| Agreement renewable: | Yes |
| Initial monetary investment advantage factor: | 1.2 (Advantage bump that A enjoys for initiating pre-IPO session vis-a-vis any future monitory investors) |

TABLE 7A

IPO Details

| | Pre-IPO Details | | Case Study Details |
|---|---|---|---|
| IPO session window: | | | 10 days |
| Whether offers proxy equity stakes: | | | Yes |
| Whether offers equity stakes: | | | Yes |
| Investment Types List: | Direct Monetary investment: | | $2000 (This is the difference between projected initial investment and the investment raised by angel and entrepreneur together) |
| | | Threshold equity investment quantum: | $1000 |
| | | Early investor advantage factor: | 1.1 (Advantage factor for early monitory investors) |
| | | Equity dilution model: | Uniform |
| | Indirect Monetary investment: | | $800 (for shipping assuming 80 effective unique customers/100 nos. of product-and $10 per shipping based on product details) |
| | | Threshold equity investment quantum: | $800 |
| | | Skill advantage bump: | 1.4 (Advantage factor for skill investor providing skill inputs) |
| | Proxy equity details: | | |
| | | No. of products up for IPO sale: | 20/100 |
| | | Consumer Ips: | 10 (Meaning subscribers are issued 10 Ips for being customers. 'Buying the product' is an investment type action allowed in this proxy store) |
| | | Referral Ips: | 6 ('Direct referral' is a recognized investment type action in this proxy store. IP worth of this action is 6.) |
| | | IPO IP bump: | 2X/(+X) (Advantage bump for subscribers performing recognized investment type actions in IPO phase) |
| | | Commission percentage: | 8%/(could be a range, say 10-6% linear) |
| | | Product price in IPO sale: | $80/(could be less than post-IPO sale price) |
| | | Threshold proxy equity investment quantum: | 1 product (Minimal criteria for a subscriber to be considered a proxy-equity holder. In the case study, a subscriber who just provides value to the business by way of referral is not considered at the time of building Dynamid) |
| | | First/subsequent business cycle length/s: | Sale of 100 nos. of Product-A or two months, whichever is earlier. (One month - subsequent) |
| | | Proxy equity effective until: | Jun. 30, 2011 |
| | | Diminishing rate of proxy equity: | 0 (implies PE does not diminish until Jun. 30, 2011) |
| | | Are External Ips effective: | No (Meaning only the Ips from listed investment type actions for the proxy are considered while building Dynamid.) |
| | | % of the product cost expected as commitment: | 30% |
| | | Early proxy investor advantage factor: | 1 (Meaning all the proxy investors are treated equal in the IPO phase. No advantage provided to early birds.) |

TABLE 7B

Dynamid Details for IPO

| | Parameter Type | IPO Dynamid details | Case Study Details |
|---|---|---|---|
| 1 | Sorting | TIE_BREAKER_RULES | Default (IPO subscribers are given priority) |
| 2 | NPI | NEIGHBORHOOD | 3 |
| 3 | NPI | NORMALIZATION_FUNCTION | Default ($k(x) = 1$) |
| 4 | Dynamid | DYNAMID_FRAME_WIDTH (W) | 3 |

TABLE 7B-continued

Dynamid Details for IPO

| | Parameter Type | IPO Dynamid details | Case Study Details |
|---|---|---|---|
| 5 | Dynamid | FLUID_SYNDICATE_STRUCTURE | True (S = f) |
| 6 | Macro-level justification | BASE_COMPENSATION_DISTRIBUTION_LOGIC | Equal |
| 7 | Macro-level justification | COMPENSATION_CARRYOVER_THRESHOLD | 2 |
| 8 | Macro-level justification | PERCENT_CARRYOVER_Lx (x < COMPENSATION_CARRYOVER_THRESHOLD) | PERCENT_CARRYOVER_L1 = 30% PERCENT_CARRYOVER_L2 = 20% |
| 9 | Micro-level justification | PENALTY_QUANTUM_NEGATIVE | −0.5 (of L1) |
| 10 | Micro-level justification | PENALTY_QUANTUM_POSITIVE | 0.5 (of L1) |
| 11 | Micro-level justification | MICRO_JUSTIFICATION_STGY | % BHU |
| 12 | Micro-level justification | BHU_PERCENT (if applicable) | 50 |
| 13 | Micro-level justification | MINIMUM_COMPENSATION_FACTOR | 0.4 |
| 14 | Micro-level justification | MAXIMUM_PENALTY_FACTOR | 3.0 |

Pre-IPO STEP IV: Initiate IPO Phase (Actors—Angel & Entrepreneur)

There are two actions involved at this stage:

1. Initiate online marketplace of the partnership agreement details;
2. Publish business and IPO details in the online marketplace business platform.

Case Study—Pre-IPO: STEP IV

At the end of pre-IPO phase, the situation stands thus:

a) A and B in partnership intend to launch an online ecommerce store in the online marketplace that sells product-A. Their partnership ratio is 60:40 (A:B).

b) Together they managed to pool $3000 and $2800 more is required which they intend to acquire through an online marketplace IPO.

c) To reduce risks involved and to arouse confidence in the IPO audience, they intend to acquire customers before even launching the business by setting a proxy store on the marketplace.

d) The actions are completed and the business pushed to the IPO phase on Oct. 21, 2010.

IPO Phase of Collaborative Business Ownership Feature

In this phase, the initiators of the business share a business plan with the entire subscriber base of the online marketplace and offer stakes (equity, proxy-equity or both) based on the criteria defined in Table 7A and 7B (IPO details). Subscribers may respond to an IPO by way of counter proposal or bidding or by committing to invest (equity investment) as per the IPO proposal based on their individual perception of how the business plan will fare in the marketplace. Alternately, subscribers have the option to be proxy equity holders by investing in corresponding types such as committing to be customers of the to-be-launched business. In either case, subscriber investments to a proxy are channeled through individual subscriber owned meta-businesses on the marketplace. This lets the subscribers strategize and split their investments between multiple proxies as per their individual sensibilities.

Steps involved in this phase:

1. Initiate IPO session;
2. Receive counter-proposals (in private) from prospective investors;
3. Finalize partnership details; and
4. Initiate post-IPO phase - or start online store and proxy store in the online marketplace.

IPO STEP I: Initiation (Actors—Angel & Entrepreneur)

IPO session started by business initiators is published on the marketplace business platform and subscribers learn of the IPO either by a push or a pull mechanism based on their individual preference.

Case Study—IPO: STEP I

On Oct. 21, 2010 the business moves to the IPO phase where business details and IPO details are made public on the marketplace.

IPO STEP II & III: Receive Counter-proposals and Finalize Partnership Details (Actors—Angel, Entrepreneur, Investors)

Subscribers (or investors) may respond to the IPO by sending counter proposals along with the investment types they are interested in. Again, interaction between IPO initiators and investors is expected to finalize equity and proxy-equity allotment to investors.

Case Study—IPO: STEP II & III

For the purpose of the case study, the investors agree to the proposal made by the initiators of IPO. Equity and proxy-equity allotment during the case study IPO is as shown in the subsequent sections.

Case Study—IPO: STEP II & III (Cont'd)—Equity Investment:

a) On Oct. 23, 2010, subscriber C commits to an equity investment of $1000. Effective monetary investment by the investors A:B:C stands as: 2000:1333.34:833.34 (1000/1.2). Corresponding percentage ownership is: 48:32:20.

b) On Oct. 25, 2010, subscriber D commits to an equity investment of $1000. Effective monetary investment by the investors A:B:C:D stands as 2000:1333.34:833.34:757.58: (1000/1.2*1.1). Corresponding percentage ownership is 40.6:27.1:16.9:15.4.

c) On Oct. 29, 2010, subscriber E commits to $800 of indirect monetary investment (Skill investment: Shipping). Effective monetary investment by the investors A:B:C:D:E stands as 2000:1333.34:833.34:757.58:771.4 (800*1.4/1.2*1.1*1.1). Corresponding percentage ownership is 35.1:23.4:14.6:13.3:13.6.

Case Study—IPO: STEP II & III (Cont'd)—Equity Investment:

The equity ownership stakes of the business among five partners is finalized as indicated above. In this case study, equity ownership of partners is calculated based on actual investment amount for simplicity sake, but the online marketplace may accomplish this by way of allotting IPs. However, the logic remains the same.

Case Study—IPO: STEP II & III (Cont'd)—Proxy Equity Investment:

a) On Oct. 22, 2010, subscriber J commits to buying two units of product-A, by actually paying 30% of the net payable which is $48 (0.3×2×80). This amount is held by the online marketplace and refunded back if the business never gets launched from IPO phase or the business owners express inability to deliver the product. Forty IPs are credited to the IP account of subscriber J, applying a 2×IPO bump to 20 IPs he has earned.

b) On Oct. 23, 2010, subscriber K commits to buying two units of product-A. Forty IPs are credited to the IP account of subscriber K, applying 2×IPO bump to 20 IPs he has earned.

c) On Oct. 23, 2010, subscriber L, referred by subscriber J, commits to buying one unit of product-A. Subscriber L is credited with 20 IPs and Subscriber J is credited with 12 (6*2) IPs The total tally of IPs as of Oct. 23, 2010 is as follows: Subscriber—52; Subscriber K—40; and Subscriber L—20. Five of 20 units of product-A available in the IPO are booked. The business has three unique customers and they were acquired before the business actually started.

Case Study—IPO: STEP II & III (Cont'd)—Proxy Equity Investment:

Continuing this way, assume all 20 units of the product are sold in the IPO phase and the IP distribution pattern at the end of IPO phase appears as shown in Table 8. For the sake of simplicity, external IPs are not considered; in other words, only the business proxy specific actions—consumer, and referral actions are awarded IPs in the example case study as specified in the policy-set.

TABLE 8

IP Distribution

| Subscriber | IPs | #Items | #Referrals |
|---|---|---|---|
| Subscriber J (L) | 52 | 2 | 1 |
| Subscriber K | 40 | 2 | 0 |
| Subscriber L (M) | 20 | 1 | 0 |
| Subscriber M (O) | 32 | 1 | 1 |
| Subscriber N | 40 | 2 | 0 |
| Subscriber O | 20 | 1 | 0 |
| Subscriber P | 20 | 1 | 0 |
| Subscriber Q (R) | 32 | 1 | 1 |
| Subscriber R (S) | 44 | 1 | 2 |
| Subscriber S (T, U) | 56 | 1 | 3 |
| Subscriber T (W, X) | 64 | 2 | 2 |
| Subscriber U (V) | 20 | 1 | 0 |
| Subscriber V (Y) | 32 | 1 | 1 |
| Subscriber W | 20 | 1 | 0 |
| Subscriber X | 20 | 1 | 0 |
| Subscriber Y | 20 | 1 | 0 |

IPO STEP IV: Initiate Post-IPO Phase (Actors—Entrepreneur, Skill Provider)

The above steps complete the IPO phase and at the end of it, the situation stands as follows:

1. Required capital for the business is raised, associated skills acquired and the equity stakes defined among the partners of the business; and
2. Initial customers for the business acquired and proxy-equity in the form of IPs allotted as proposed in the IPO.

In the case study, every action is assumed to be completed in a timely manner and as per the expectations of the business initiators. However, this may not always occur and business initiators may take several decisions at the end of IPO phase such as a) to extend the IPO time frame if insufficient equity or proxy-equity was raised;

b) decide to start the business with whatever equity or proxy equity was raised;

c) modify certain IPO attributes to make it more attractive to the prospective investors and extend the session window; or d) rescind the business plan and make necessary refunds.

The online marketplace provides options to let the business initiators take any of the above decisions at the end of IPO phase.

Case Study—IPO: STEP IV

In the case study, it is assumed every action is complete as per the expectations of IPO initiators. The business is ready to be pushed to the next phase by Oct. 31, 2010 and the collaborative online store along with corresponding proxy is opened in the online marketplace on Nov. 1, 2010.

Post-IPO Phase of Collaborative Business Ownership Feature

The purpose of the IPO process would have been served by the time the post-IPO phase starts, at least partially. So, it is time for conducting the business, with the major initiative lying with the entrepreneur and the skill providers (Shipper E in the case study).

Steps involved in this post-IPO phase include:

1. Initiate online store operation - fulfill proxy equity obligations first;
2. First business cycle completion - Dynamid generation and settling proxy equity stakes;
3. Periodic proxy equity settlement based on IPO contract; and
4. Optional subsequent IPOs.

Post-IPO STEP I: Initiation (Entrepreneur, Associated Skill Provider, Marketplace Engine)

The online business starts operations such as receiving online orders and fulfilling them, like any other e-commerce store. Money generated by the business from each online sale is split among equity investors as per the defined equity ratio towards the end of IPO phase. Also proxy equity obligations are handled on priority basis.

Case Study—Post-IPO: STEP I

For each sale of product-A, the money is split as shown in Table 9. The sale price of product-A is $80 plus shipping costs. The proxy equity share (customer commission) on each sale is 8% of the product price, which goes into proxy equity pocket after each sale.

TABLE 9

Equity Shares in Post-IPO phase

| | |
|---|---|
| Proxy Equity Account | $6.4 [Proxy equity share → 8% of product sale price] |
| A's share | $28.28 [$20 + $(0.351 * 23.6)] |
| B's share | $15.52 [$10 + $(0.234 * 23.6)] |
| C's share | $13.44 [$10 + $(0.146 * 23.6)] |
| D's share | $13.13 [$10 + $(0.133 * 23.6)] |
| E's share | $11.20 [$8 + $(0.136 * 23.6)] |

Case Study—Post-IPO: STEP I (Cont'd)

Assuming all 100 units of product-A are sold for $80 each by Dec. 25, 2010, the net tally is as shown in Table 10.

TABLE 10

Net Equity Shares

| Shareholder | Investment | Final earnings |
|---|---|---|
| PEA | NA | $ 640 |
| A | 2000 | $2828 |
| B | 1000 | $1552 |
| C | 1000 | $1344 |
| D | 1000 | $1313 |
| E | 800 | $1120 |

Case Study—Post-IPO: STEP I (Cont'd)

The proxy equity account indicates what is returned to the consumers at the time of proxy equity (IP) settlement elaborated in subsequent sections using the Dynamid algorithm. Though this demonstration is specific to a primary market scenario in the online marketplace, the settlement methodology remains same in case of ecommerce proxy started in the online marketplace directly (bypassing the IPO) or proxy of an existing online business or businesses that are not online.

Post-IPO STEP II: First Business Cycle Completion (Actors—Marketplace Dynamid Algorithm)

In this step, proxy equity settlement is accomplished using the Dynamid algorithm of the online marketplace. Details of the Dynamid algorithm are elaborated in the Dynamid section. Configuration parameters required to generate Dynamid are selected from the proxy policy-set specified as part of IPO details (Table 7B).

Case Study—Post-IPO: STEP II

For the case study, a possible Dynamid output is described to demonstrate how proxy equity settlement is accomplished at the end of first business cycle. Subsequent cycles also follow much the same logic, with minor variations. By Dec. 25, 2010 all 100 units of product of the business A&B Inc are sold and Table 11 shows a snap shot of the proxy equity holding of the customer base (in descending order of IPs).

TABLE 11

Proxy Equity Holding of Customer Base for First Business Cycle

| SNo. | Customer | IPs | #items purchased |
|---|---|---|---|
| 1 | Sub 1 | 68 | 5 |
| 2 | T | 64 | 2 |
| 3 | S | 56 | 1 |
| 4 | Sub 2 | 54 | 3 |
| 5 | J | 52 | 2 |
| 6 | R | 44 | 1 |
| 7 | Sub 3 | 42 | 3 |
| 8 | K | 40 | 2 |
| 9 | N | 40 | 2 |
| 10 | Sub 4 | 38 | 2 |
| 11 | Sub 5 | 34 | 1 |
| 12 | Sub 6 | 34 | 1 |
| 13 | M | 32 | 1 |
| 14 | Q | 32 | 1 |
| 15 | V | 32 | 1 |
| 16 | Sub 7 | 32 | 2 |
| 17 | Sub 8 | 32 | 2 |
| 18 | Sub 9 | 26 | 2 |
| 19 | Sub 10 | 22 | 1 |
| 20 | Sub 11 | 22 | 1 |
| 21 | Sub 12 | 22 | 1 |
| 22 | L | 20 | 1 |
| 23 | O | 20 | 1 |
| 24 | P | 20 | 1 |
| 25 | U | 20 | 1 |
| 26 | W | 20 | 1 |
| 27 | X | 20 | 1 |
| 28 | Y | 20 | 1 |
| 29 | Sub 13 | 20 | 2 |
| 30 | Sub 14 | 20 | 2 |
| 31 | Sub 15 | 20 | 2 |
| 32 | Sub 16 | 20 | 2 |
| 33 | Sub 17 | 20 | 2 |
| 34 | Sub 18 | 20 | 2 |
| 35 | Sub 19 | 20 | 2 |
| 36 | Sub 20 | 20 | 2 |
| 37 | Sub 21 | 20 | 2 |
| 38 | Sub 22 | 20 | 2 |
| 39 | Sub 23 | 20 | 2 |
| 40 | Sub 24 | 20 | 2 |
| 41 | Sub 25 | 20 | 2 |
| 42 | Sub 26 | 20 | 2 |
| 43 | Sub 27 | 20 | 2 |
| 44 | Sub 28 | 16 | 1 |
| 45 | Sub 29 | 16 | 1 |
| 46 | Sub 30 | 16 | 1 |
| 47 | Sub 31 | 16 | 1 |
| 48 | Sub 32 | 10 | 1 |
| 49 | Sub 33 | 10 | 1 |
| 50 | Sub 34 | 10 | 1 |
| 51 | Sub 35 | 10 | 1 |
| 52 | Sub 36 | 10 | 1 |
| 53 | Sub 37 | 10 | 1 |
| 54 | Sub 38 | 10 | 1 |
| 55 | Sub 39 | 10 | 1 |
| 56 | Sub 40 | 10 | 1 |
| 57 | Sub 41 | 10 | 1 |
| 58 | Sub 42 | 10 | 1 |
| 59 | Sub 43 | 10 | 1 |
| 60 | Sub 44 | 10 | 1 |
| 61 | Sub 45 | 10 | 1 |
| 62 | Sub 46 | 10 | 1 |
| 63 | Sub 47 | 10 | 1 |
| 64 | Sub 48 | 10 | 1 |
| 65 | Sub 49 | 10 | 1 |
| 66 | Sub 50 | 10 | 1 |
| 67 | Sub 51 | 10 | 1 |
| 68 | Sub 52 | 10 | 1 |
| 69 | Sub 53 | 10 | 1 |

Case Study—Post-IPO: STEP II (Cont'd)

Configuration parameters required to generate Dynamid are picked from the proxy policy-set specified as part of IPO details (Table 7B). The proxy equity account of $640 is settled among the proxy equity holders as shown in Table 12, which is the final output of Dynamid algorithm. Percent Benefit Higher Ups (% BHU) in the table header below refers to the strategy used while generating Dynamid.

TABLE 12

Compensation Distribution Using (50) % BHU Strategy

| SNo | Customer | Compensation (50 % BHU) in $ |
|---|---|---|
| 1 | Sub 1 | $55.71 |
| 2 | T | $55.71 |
| 3 | S | $29.51 |
| 4 | Sub 2 | $27.96 |
| 5 | J | $27.96 |
| 6 | R | $24.78 |
| 7 | Sub 3 | $24.78 |
| 8 | K | $18.09 |
| 9 | N | $14.25 |
| 10 | Sub 4 | $14.25 |
| 11 | Sub 5 | $ 8.23 |
| 12 | Sub 6 | $ 8.23 |
| 13 | M | $ 8.23 |
| 14 | Q | $ 8.23 |
| 15 | V | $ 8.23 |
| 16 | Sub 7 | $ 8.23 |
| 17 | Sub 8 | $ 8.23 |
| 18 | Sub 9 | $ 8.23 |
| 19 | Sub 10 | $ 8.23 |
| 20 | Sub 11 | $ 8.23 |
| 21 | Sub 12 | $ 8.23 |
| 22 | L | $ 8.23 |
| 23 | O | $ 8.23 |
| 24 | P | $ 8.23 |
| 25 | U | $ 8.23 |
| 26 | W | $ 8.23 |
| 27 | X | $ 6.98 |
| 28 | Y | $ 6.28 |
| 29 | Sub 13 | $ 5.94 |
| 30 | Sub 14 | $ 5.76 |
| 31 | Sub 15 | $ 5.68 |
| 32 | Sub 16 | $ 5.63 |
| 33 | Sub 17 | $ 5.61 |
| 34 | Sub 18 | $ 5.60 |
| 35 | Sub 19 | $ 5.59 |
| 36 | Sub 20 | $ 5.59 |
| 37 | Sub 21 | $ 5.59 |
| 38 | Sub 22 | $ 5.59 |
| 39 | Sub 23 | $ 5.59 |
| 40 | Sub 24 | $ 4.66 |
| 41 | Sub 25 | $ 4.66 |
| 42 | Sub 26 | $ 4.66 |
| 43 | Sub 27 | $ 4.66 |
| 44 | Sub 28 | $ 4.66 |
| 45 | Sub 29 | $ 4.66 |
| 46 | Sub 30 | $ 4.66 |
| 47 | Sub 31 | $ 4.66 |
| 48 | Sub 32 | $ 4.66 |
| 49 | Sub 33 | $ 4.66 |
| 50 | Sub 34 | $ 4.66 |
| 51 | Sub 35 | $ 4.66 |
| 52 | Sub 36 | $ 4.66 |
| 53 | Sub 37 | $ 4.66 |
| 54 | Sub 38 | $ 4.66 |
| 55 | Sub 39 | $ 4.66 |
| 56 | Sub 40 | $ 4.66 |
| 57 | Sub 41 | $ 4.66 |
| 58 | Sub 42 | $ 4.66 |
| 59 | Sub 43 | $ 4.66 |
| 60 | Sub 44 | $ 4.66 |
| 61 | Sub 45 | $ 4.66 |
| 62 | Sub 46 | $ 4.66 |
| 63 | Sub 47 | $ 4.66 |
| 64 | Sub 48 | $ 4.66 |
| 65 | Sub 49 | $ 4.66 |
| 66 | Sub 50 | $ 4.66 |
| 67 | Sub 51 | $ 4.66 |
| 68 | Sub 52 | $ 4.66 |
| 69 | Sub 53 | $ 4.66 |

Case Study—Post-IPO: STEP II (Cont'd)

Note the skew in the compensation distribution, with the top 12 customers (proxy equity holders) of A&B Inc claiming approximately 50% of the proxy equity account. This result was deliberately introduced into the Dynamid generation algorithm by using a % BHU strategy which suits the IPO scenario in the online marketplace. Other strategies possible are BHU (Benefit Higher Ups), BLD (Benefit Lower Downs), or BAL (Balanced). Different strategies for Dynamid generation are discussed in the Dynamid section. Table 13 below shows the compensation distribution using BAL strategy to illustrate the difference between strategies.

TABLE 13

Compensation Distribution Using BAL Strategy

| SNo | Customer | Comp (BAL) in $ |
|---|---|---|
| 1 | Sub 1 | $36.22 |
| 2 | T | $36.22 |
| 3 | S | $27.41 |
| 4 | Sub 2 | $25.81 |
| 5 | J | $25.81 |
| 6 | R | $21.89 |
| 7 | Sub 3 | $21.89 |
| 8 | K | $15.89 |
| 9 | N | $14.89 |
| 10 | Sub 4 | $14.89 |
| 11 | Sub 5 | $ 8.93 |
| 12 | Sub 6 | $ 8.93 |
| 13 | M | $ 8.93 |
| 14 | Q | $ 8.93 |
| 15 | V | $ 8.93 |
| 16 | Sub 7 | $ 8.93 |
| 17 | Sub 8 | $ 8.93 |
| 18 | Sub 9 | $ 8.93 |
| 19 | Sub 10 | $ 8.93 |
| 20 | Sub 11 | $ 8.93 |
| 21 | Sub 12 | $ 8.93 |
| 22 | L | $ 8.93 |
| 23 | O | $ 8.93 |
| 24 | P | $ 8.93 |
| 25 | U | $ 8.93 |
| 26 | W | $ 8.93 |
| 27 | X | $ 7.93 |
| 28 | Y | $ 7.24 |
| 29 | Sub 13 | $ 6.89 |
| 30 | Sub 14 | $ 6.71 |
| 31 | Sub 15 | $ 6.63 |
| 32 | Sub 16 | $ 6.58 |
| 33 | Sub 17 | $ 6.56 |
| 34 | Sub 18 | $ 6.55 |
| 35 | Sub 19 | $ 6.55 |
| 36 | Sub 20 | $ 6.54 |
| 37 | Sub 21 | $ 6.54 |
| 38 | Sub 22 | $ 6.54 |
| 39 | Sub 23 | $ 6.54 |
| 40 | Sub 24 | $ 5.61 |
| 41 | Sub 25 | $ 5.61 |
| 42 | Sub 26 | $ 5.61 |
| 43 | Sub 27 | $ 5.61 |
| 44 | Sub 28 | $ 5.61 |
| 45 | Sub 29 | $ 5.61 |
| 46 | Sub 30 | $ 5.61 |
| 47 | Sub 31 | $ 5.61 |
| 48 | Sub 32 | $ 5.61 |
| 49 | Sub 33 | $ 5.61 |
| 50 | Sub 34 | $ 5.61 |
| 51 | Sub 35 | $ 5.61 |
| 52 | Sub 36 | $ 5.61 |
| 53 | Sub 37 | $ 5.61 |
| 54 | Sub 38 | $ 5.61 |
| 55 | Sub 39 | $ 5.61 |
| 56 | Sub 40 | $ 5.61 |
| 57 | Sub 41 | $ 5.61 |
| 58 | Sub 42 | $ 5.61 |

TABLE 13-continued

Compensation Distribution Using BAL Strategy

| SNo | Customer | Comp (BAL) in $ |
|---|---|---|
| 59 | Sub 43 | $5.61 |
| 60 | Sub 44 | $5.61 |
| 61 | Sub 45 | $5.61 |
| 62 | Sub 46 | $5.61 |
| 63 | Sub 47 | $5.61 |
| 64 | Sub 48 | $5.61 |
| 65 | Sub 49 | $5.61 |
| 66 | Sub 50 | $5.61 |
| 67 | Sub 51 | $5.61 |
| 68 | Sub 52 | $5.61 |
| 69 | Sub 53 | $5.61 |

Post-IPO STEP III: Periodic Proxy Equity Settlement Based on IPO Contract (Actors—Marketplace Dynamid Algorithm)

As the online store—along with its proxy—continues to operate in the online marketplace, proxy equity settlement is periodically accomplished as per the policy-set specification of the proxy. The contract between the business (equity) shareholders expires with the completion of the first business cycle. The primary owner of the business (B in the case study) may then decide to either continue or terminate the business. However, if the business continues, the proxy equity holders retain their IP advantage until it expires (Jun. 30, 2011 in the case study). Further, the policy-set may be modified to alter the compensation distribution pattern during subsequent settlements as per the discretion of primary business owner based on the owner's business objectives.

Post-IPO STEP IV: Optional Subsequent IPOs (Actors—Entrepreneur)

The IPO phase may be initiated as many times as is required by business owners in the online marketplace. Business owners may bypass the IPO phase but still choose to retain corresponding business proxy, which would, in that case, serve as a sales channel in the online marketplace.

Note—Collaborative Business Ownership

Online marketplace supports all the actions defined in the above steps by providing the necessary screens, data storage and data flow mechanisms. The online marketplace may also be implemented to charge for enabling the entire IPO process.

Dynamid Concept

A Dynamid (dynamic pyramid) represents a subscriber compensation distribution pattern of a given business proxy in a given business cycle in the online marketplace. It may be viewed as a generalization of a classical MLM pyramid in the context of online marketplace. A distinguishing factor of a Dynamid from a classical MLM pyramid is that it is generated dynamically from a flat online marketplace subscriber base purely on the online marketplace criteria. The matrix shown in Table 14 summarizes the differences between MLM pyramid and Dynamid.

TABLE 14

Dynamid Frame and Node Attributes

| No. | Classical MLM Pyramid | Dynamid |
|---|---|---|
| 1 | Customer positioning in pyramid is static. | Customers are dynamically positioned in a Dynamid at the time of building it. Dynamids are built afresh whenever required and dismantled completely once their purpose is served. |
| 2 | Parent-child relationship once defined between two particular nodes in an MLM pyramid is final and never gets altered. | Parent-child relationship between two nodes in a Dynamid is scoped by business cycle. It is possible for the nodes to switch places in subsequent business cycles. |
| 3 | Parent-child relationship is strictly one-to-many in a classical MLM pyramid. | Multiple parentage is possible in a Dynamid; meaning, commission component from a Dynamid node could be distributed between more than one nodes as dictated by the algorithm. |
| 4 | Referrals form the entire basis for erecting an MLM pyramid. | Multiple ways available for customers to contribute to businesses are tapped while building a Dynamid. Technological advances are exploited to enable this. |
| 5 | 'Sense of justification' of the rationale to build pyramids based on referrals, from customer's perspective, is trivial. | To establish a 'sense of justification' in case of Dynamid is a bit complex. This is achieved at multiple levels, explained below as part of the algorithm description. Justification at three levels (macro, micro & final) is demonstrated in subsequent sections. |

In the context of collaborative business ownership on the marketplace, the Dynamid algorithm may be applied for both equity and proxy-equity settlements. In an example embodiment, a social networking community on the marketplace may start an online store in which each member invests in terms of money, skill or services according to his or her capabilities, grabbing equity or proxy-equity stakes, while the Dynamid algorithm handles the compensation distribution aspect.

Dynamid Generation Algorithm

Dynamid Generation—Inputs Required for Dynamid Generation

1. Subscriber IP(proxy-equity) distribution profile; and
2. Policy-set of the Business Proxy that define various attributes of to-be-generated Dynamid.

Case study used for demonstrating collaborative business ownership concept using IPO on the marketplace is extended to represent Dynamid generation as well. The inputs used for the fictitious Dynamid generation case study are in Table 11 and Table 7B.

Figure 2A:
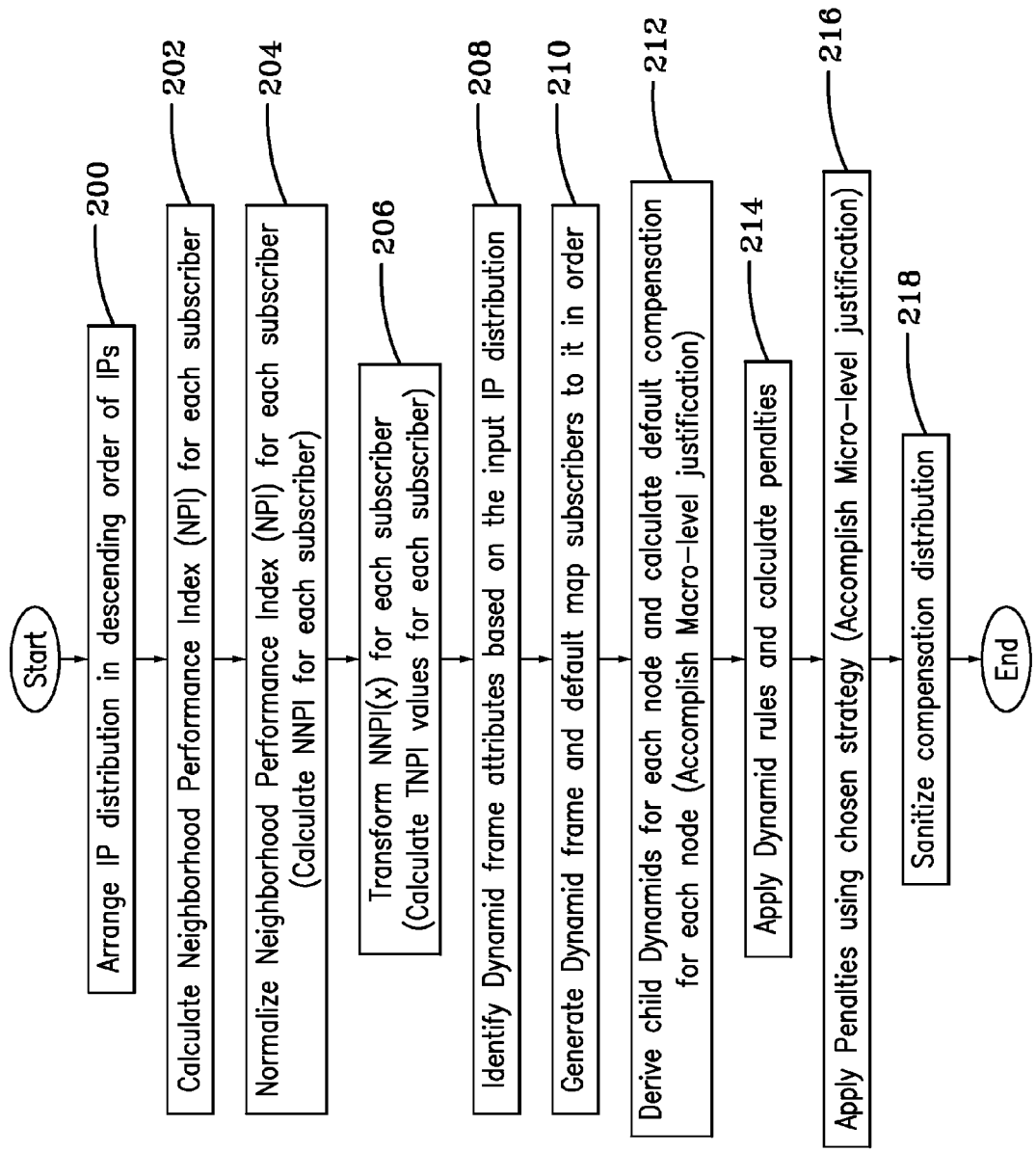

FIG. 2A illustrates a flowchart that depicts compensation distribution process on the marketplace. In particular, a Dynamid generation process is described. Each of these steps involved in Dynamid generation are explained in subsequent sections. Case study specific output from each algorithm step can be seen in FIGS. 2B and 2D.

Dynamid Generation Steps

Step 1 (200): Arrange IP distribution in descending order of IPs.

| | |
|---|---|
| Required input: | IP distribution (of size = t); Tie-breaker rules in the Proxy policy-set |
| Process: | Arrange subscriber profiles in descending order of IPs. Tie breaker rules are specified in the policy-set of the business proxy. Default tie-breaker rule in case none specified in the policy-set is based on the subscriber's seniority in the online marketplace. |
| Output: | IP distribution sorted in descending order. Each subscriber is assigned a rank from 1 to 't' in the IP distribution. An array of nodes [Rank(X), IP(X)] for subscriber X. |

Case Study: Step 1

| | |
|---|---|
| Input: | IP distribution in Table-11 (t = 69) Tie-breaker rules - Default (implies IPO users are given precedence) |
| Process: | Arrange subscriber profiles in descending order of IPs. Use default tie breaker rules. |
| Output: | IP distribution in descending order - [(1, 68), (2, 64), (3, 56), (4, 54), (5, 52), (6, 44), (7, 42), (8, 40), (9, 40), (10, 38) . . . (69, 10)] |

Step 2 (202): Calculate Neighborhood Performance Index (NPI) for each subscriber.

Understanding NPI(x): While the rank arrived at in Step 1 represents the position of a subscriber with respect to the entire IP distribution, the NPI value represents the status of a subscriber in the defined neighborhood. NPI(x)>1 implies the associated subscriber is nearer to the higher end of IP spectrum in the defined neighborhood and vice versa. A higher value of NPI indicates a better performance of the respective subscriber in the defined neighborhood. Rank represents the IP performance of a subscriber at a macro-level while NPI represents IP performance at micro-level.

Case Study: Step 2

| | |
|---|---|
| Input: | IP distribution in descending order - [(1, 68), (2, 64), (3, 56), (4, 54), (5, 52), (6, 44), (7, 42), (8, 40), (9, 40), (10, 38) . . . (69, 10)] Neighborhood = 3; from proxy policy set. |
| Process: | Sample: NPI(6, 3) = (44 − (42 + 40 + 40)/3)/((56 + 54 + 52)/ 3 − 44 + 1) = 0.3030302 |
| Output: | NPI values - (1, 8.6666), (2, 2.0000), (3, 0.5454), (4, 0.8275), (5, 1.4285), (6, 0.3030302) . . . (69, 0.0370)] |

Step 3 (204): Normalize Neighborhood Performance Index (NPI) for each subscriber (Calculate NNPI for each subscriber).

Understanding NNPI(x): NPI values calculated in the previous step are valid within respective neighborhoods that are different for each subscriber and hence cannot be compared to each other, whereas NNPI values bring the indices to a common scale to enable comparison. A default normalization factor accomplishes this to an extent while further degree of normalization may be enforced by the normalization function k(x).

| | |
|---|---|
| Required input: | NPI values for each subscriber in the IP distribution, Normalization function in the Proxy policy-set. |
| Process | NNPI is calculated using the following formula - NNPI (x) = NPI(x) × [(t + 1) − Rank(x)]/t × k(x) where [(t + 1) − Rank(x)]/t is the default normalization factor and k(x) is proxy specific normalization function that further augments the default normalization factor. Examples could be 1/Rank(x) or Percentile(x)/100 etc. If none specified, k(x) = 1. |
| Output: | NNPI values calculated for each subscriber |

Case Study: Step 3

| | |
|---|---|
| Input: | NPI values - [(1, 8.6666), (2, 2.0000), (3, 0.5454), (4, 0.8275), (5, 1.4285), (6, 0.3030302) ... (69, 0.0370)] k(x) = 1 (by default) |
| Process | Sample - NNPI(6) = (0.30303) * (70 − 6)/69 = 0.28107 (with t = 69 & k(x) = 1) |
| Output: | NNPI values - [(1, 8.6666), (2, 2.0000), (3, 0.5454), (4, 0.8275), (5, 1.4285), (6, 0.2810) . . . (69, 0.0370)] |

| | |
|---|---|
| Required input: | Sorted IP distribution, Integer neighborhood value from the Proxy policy-set. |
| Process: | NPI for each subscriber is calculated using the following formula— $$NPI(x, n) = \frac{IP(x) - AVG[IP(x+1), IP(x+2), \ldots IP(x+n)]}{AVG[IP(x-1), IP(x-2), \ldots IP(x-n)] - IP(x) + 1}$$ where n is neighborhood and x is any given subscriber and, NPI(1, n) = MAX[NPI(2, n), NPI(3, n), . . . ] And if NPI(x1, n) = 0, NPI(x1, n) = MIN[NPI(2, n), NPI(3, n), . . . ]/2 |
| Output: | NPI values calculated for each subscriber for a defined neighborhood. |

Step 4 (206): Transform NNPI(x) for each subscriber (Calculate TNPI values for each subscriber).

Understanding TNPI(x): Although NNPI values calculated in the previous step are mapped to a common scale; comparison is difficult as the values are not bounded. Transformation of NNPI values help in confining the neighborhood performance indices of all the subscribers to the range (−1, 1) thus facilitating comparison and finally applying the Dynamid generation rules to the IP distribution (in subsequent steps). Positive TNPI value implies 'good' IP performance in the defined neighborhood with the subject's IP value nearer to the upper end of IP distribution in the neighborhood. Likewise a negative value implies subject's IP is nearer to the lower end of IP spectrum in the neighborhood

| | |
|---|---|
| Required input: | NNPI values for each subscriber in the IP distribution |
| Process: | TNPI is calculated using the following formula -<br>if (NNPI(x) > 1){<br>    TNPI(x) = 1 − 1/ NNPI(x);<br>} else{<br>    TNPI(x) = NNPI(x) − 1;<br>} |
| Output: | TNPI values calculated for each subscriber. |

Case Study: Step 4

| | |
|---|---|
| Input: | NNPI values - [(1, 8.6666), (2, 2.0000), (3, 0.5454), (4, 0.8275), (5, 1.4285), (6, 0.2810) . . . (69, 0.0370)] |
| Process | Sample -<br>TNPI (6) = (0.28107 − 1) = −0.71893 |
| Output: | TNPI values - [(1, 0.8846), (2, 0.4926), (3, −0.4703), (4, −0.2084), (5, 0.2569), (6, −0.7189) . . . (69, −0.9994)] |

Case Study: Step 4 (Con't.)

Figure 3:
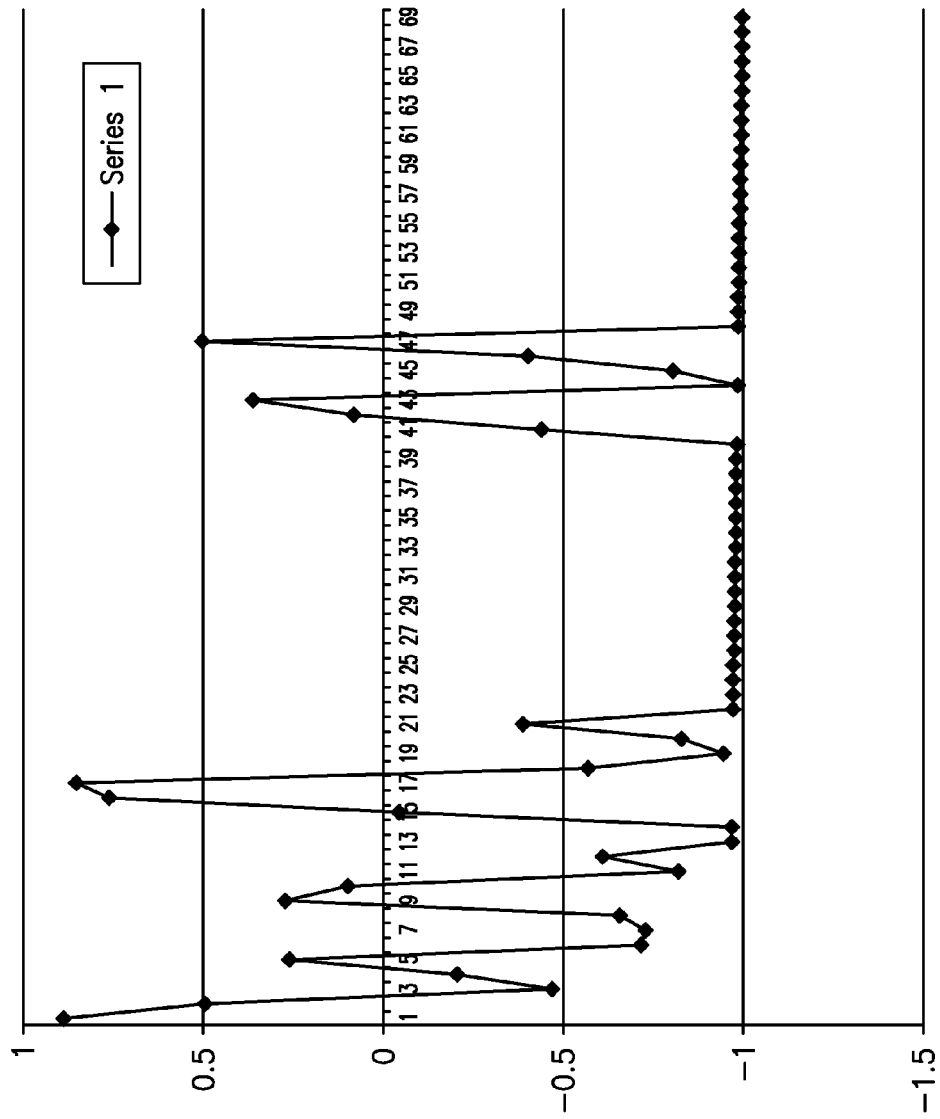
FIG. 3 is a chart plotting transformed neighborhood performance index (TNPI) values for the example case study detailed below.

Refer to FIG. 3 for a line chart plotting TNPI values for the example case study where t=69.

Step 5 (208): Identify Dynamid Frame attributes for the IP distribution.

Understanding Dynamid Frame: Dynamid frame for a given IP distribution of size 't' is a collection of T number of three dimensional node representations (d, p, w) each corresponding to a subscriber in the distribution. Integer values of D (depth), W (width), N (top nodes) are considered primary Dynamid frame attributes. There is yet another secondary frame attribute 'S' which assists Dynamid frame generation when the IP distribution contains one or more composite entities. A composite entity in an IP distribution is a predefined syndicate structure of subscribers built outside the scope of Dynamid algorithm of online marketplace. For example, if the business proxy in question is associated to an MLM business with an existing static pyramid structure and prefers not to disturb the pyramid at the time of Dynamid generation, the value of 'S' may be set to 'p—Predefined Syndicate Structure'. Otherwise the default value of 'S' (f—Fluid Syndicate Structure) may be considered while generating Dynamid—in which case the syndicate is decomposed to individual subscriber level before generating the Dynamid. Thus, a Dynamid frame may be represented by the four attributes as [D,W,N,S]. Dynamid frame and node attributes are summarized in Table 15. Convenient math pertaining to Dynamid frame generation from the attributes is summarized in Table 17.

TABLE 15

Dynamid Frame and Node Attributes

| | | |
|---|---|---|
| D | Frame Attribute | depth of Dynamid Frame |
| d | Node Attribute | depth/level indicator of the node; value $\in$ $\{1, 2, \ldots D\}$. |
| W | Frame Attribute | width of the Dynamid frame |
| w | Node Attribute | width indicator of the node; value $\in \{1, 2 \ldots W\}$ |
| N | Frame Attribute | number of top nodes of the Dynamid frame |
| p | Node Attribute | parent absolute position indicator of the node; value $\in \{1, 2 \ldots N * W^{(d-2)}\}$ |
| S | Frame Attribute | determines if composite entities are allowed while generating Dynamid frame or not. Allowed values - 'p' or 'f' |

For example, [5, 4, 1, f] Dynamid frame has the following nodes depicted in Table 16. In this example, had the value of N been 2, Level 1 would contain two nodes (1, 0, 1) and (1, 0, 2) and each of these top level nodes would have similar structure as shown, in effect doubling the number of total nodes.

TABLE 16

Example Dynamid Frame Nodes

Level 1 - (1, 0, 1)

Level 2 - (2, 1, 1) (2, 1, 2) (2, 1, 3) (2, 1, 4)

Level 3 - (3, 1, 1) (3, 1, 2) (3, 1, 3) (3, 1, 4)|(3, 2, 1) (3, 2, 2) (3, 2, 3)(3, 2, 4)|(3, 3, 1) (3, 3, 2) (3, 3, 3) (3, 3, 4)|(3, 4, 1) (3, 4, 2) (3, 4, 3) (3, 4, 4)

Level 4 - (4, 1, 1) (4, 1, 2) . . . (4, 16, 3) (4, 16, 4)

Level 5 - (5, 1, 1) (5, 1, 2) . . . (5, 64, 3) (5, 64, 4)

TABLE 17

Convenient Math Pertaining to Dynamid Frames

| | |
|---|---|
| Total number of nodes in a Dynamid frame [D, W, N, S] | $T[D, W, N, S] = N \times [\{i = 1 \to D\} \Sigma W^{(i-1)}]$ |
| Immediate child nodes of a Dynamid Node (x, y, z) in [D, W, N, S] | $((x + 1), ((y - 1) \times W + z), \{1, 2 \ldots W\})$ |
| Direct parent of Dynamid node (x, y, z) in [D, W, N, S] | $((x - 1), [y/W] + 1, (y \% W))$ if $x > 2$<br>$((x - 1), 0, (y \% W))$ if $x = 2$ |

Thus, to generate a Dynamid frame, four attributes D, W, N, S are required. Two out of the four attributes (W and S) are directly read from the policy-set of proxy while the other two are inferred in this step. Note these attributes are used to generate 'Dynamid Frame'; the actual Dynamid is built when the subscribers are mapped to the nodes of the frame.

TABLE 18

Dynamid Frame Attributes

| | |
|---|---|
| W | Width of the Dynamid frame or Maximum number of child nodes allowed in a Dynamid (note: not the frame.). This value is set by the proxy based on its business objectives in the online marketplace. For example, a higher value of W is attractive for initial customers (perhaps, in an IPO in the online marketplace) while not so attractive for newcomers once sufficient consumer base is built. Recommended value for W in the online marketplace is between 3 and 6. Default value is 4. |
| S | If there are composite entities in the IP distribution and if the business proxy intends to retain pre-defined syndicate structure while generating Dynamid, the value of S is 'p'. Default value is 'f' - in which case all the entities in the IP distribution are considered fine-grained entities (individual subscribers). |
| N | Number of top nodes is either set by online marketplace admin empirically based on IP distribution size 't' or inferred by the following formula -<br>N = Max [Number of upper outliers in IP distribution, Number of entities before first crossover from positive TNPI to negative TNPI values in TNPI plot]<br>Number of upper outliers in IP distribution is the number of subscribers in the distribution whose IP values are more than [Upper Quartile + b (Inter Quartile Range)] for a value of 'b' set by online marketplace admin. Default value of b is 1.5. |
| D | Depth of Dynamid depends on the size of IP distribution 't' such that<br>$T[(D-1), W, N, S] < t < T[D, W, N, S]$ |
| Required input: | TNPI values for each subscriber in the IP distribution, Dynamid attributes (W and S) from Proxy policy-set. |
| Process: | Infer the values of D & N from the IP distribution based on the logic elaborated above in Table 18. |
| Output: | All the Dynamid frame attributes read or inferred. |

Case Study: Step 5

| | |
|---|---|
| Input: | TNPI values - [(1, 0.8846), (2, 0.4926), (3, −0.4703), (4, −0.2084), (5, 0.2569), (6, −0.7189) . . . (69, −0.9994)]<br>Width of Dynamid Frame = 3<br>Fluid syndicate structure = true (S = 'f') |
| Process: | Infer value of N -<br>a) Calculate number of outliers in IP distribution<br>   Upper Quartile(UQ) = 32<br>   Lower Quartile(LQ) = 10<br>   Inter Quartile Range(IQR) = UQ − LQ = 32 − 10 = 22<br>   UQ + 1.5 (IQR) = 65<br>   Number of subscribers with IP value more than 65 = 1<br>b) From the TNPI plot in FIG.-3, number of entities before first crossover from positive TNPI to negative TNPI = 2<br>Thus, N = Max[1, 2] = 2<br>Calculate D -<br>T[3, 3, 2, f] < 69 < T[4, 3, 2, f] [W = 3 and S = f from policy-set]<br>Hence D = 4. |
| Output: | D = 4; W = 3; N = 2; S = f |

Step 6 (210): Generate Dynamid frame and default map subscribers to it in order.

| | |
|---|---|
| Required input: | Dynamid frame attributes, IP distribution |
| Process: | Generate three dimensional node representations (d, p, w) for Dynamid nodes based on the attributes calculated in the above step and math depicted in Table 17. Then map the node representations to subscribers in the IP distribution in descending order of IPs. Ignore node representations that have no subscribers to be mapped. |
| Output: | Dynamid node representation for all the subscribers in the IP distribution calculated. In other words, all the subscribers are positioned appropriately in the Dynamid frame generated. |

Case Study: Step 6

| | |
|---|---|
| Input: | Dynamid frame attributes; D = 4; W = 3; N = 2; S = f<br>IP distribution in descending order. |
| Process: | Generate Dynamid frame from the attributes identified in previous step. Necessary math is depicted in Table 17<br>Map subscribers to Dynamid frame nodes in descending order. |
| Output: | Dynamid Frame generated and all the subscribers are mapped to Dynamid nodes. Refer Table 19. |

TABLE 19

Dynamid Node Representation of Subscribers

| Dynamid Nodes (d, p, w) | Customer | IPs |
|---|---|---|
| (1, 0, 1) | S1 | 68 |
| (1, 0, 2) | T | 64 |
| (2, 1, 1) | S | 56 |
| (2, 2, 1) | S2 | 54 |
| . . . | . . . | . . . |
| (4, 16, 3) | S52 | 10 |
| (4, 2, 3) | S53 | 10 |

Step 7 (212): Accomplish Macro-level justification—Derive child Dynamids for each node and calculate default compensation for each subscriber.

Understanding Macro-level justification: Macro-level justification of compensation distribution is accomplished based on the respective positions of subscribers with respect to the entire IP distribution. Default compensation calculated in this step may be viewed as a function of a subscriber's rank: the higher the rank, the higher is the default compensation. Subsequent steps factor in the micro level performance of each subscriber (TNPI values calculated in Step 4) to calculate multi-level justified final compensation for each subscriber.

| | |
|---|---|
| Required input: | Dynamid node representations of all the subscribers in IP distribution, Proxy policy set<br>(values for 'Base_Compensation_Distribution_Logic', 'Compensation_Carryover_Threshold', 'Percent_Carryover' for each level), Proxy Equity Account. |

-continued

| | |
|---|---|
| Process: | Proxy Equity Account is distributed among the subscribers in the IP distribution as specified by 'Base_Compensation_Distribution_Logic' attribute of the policy-set. Then, child nodes for each Dynamid node are derived based on the math depicted in Table 17 until 'Compensation_Carryover_Threshold' level. Then default compensation for each subscriber is calculated based on 'Percent_Carryover' values for each level. |
| Output: | Default compensation is calculated for all the Dynamid node representations following the process shown. |

Case Study: Step 7

| | |
|---|---|
| Input: | Dynamid node representations for all subscribers<br>BASE_COMPENSATION_DISTRIBUTION_LOGIC = Equal<br>COMPENSATION_CARRYOVER_THRESHOLD = 2<br>PERCENT_CARRYOVER_L1 = 30%<br>PERCENT_CARRYOVER_L2 = 20%<br>Proxy Equity Account = $640 |
| Process: | Each subscriber is initially allotted the base compensation of $640/69 = $9.27<br>Generate child dynamids for all the nodes to a maximum of 2 levels as suggested by 'COMPENSATION_CARRYOVER_THRESHOLD' attribute. Sample child dynamid generation is depicted in Table 20. Calculate default compensation for each node (subscriber) by implementing percent compensation carryover as depicted in Table 21. |
| Output: | Default compensation calculated for all nodes (Subscribers). Refer Table 22. |

TABLE 20

Sample Child Dynamid for node (1, 0, 1)

| | |
|---|---|
| L0 | (1, 0, 1) |
| L1 | (2, 1, 1) (2, 1, 2) (2, 1, 3) |
| L2 | (3, 1, 1) (3, 1, 2) (3, 1, 3) (3, 2, 1) (3, 2, 2) (3, 2, 3) (3, 3, 1) (3, 3, 2) (3, 3, 3) |

This is the child Dynamid generated for the Dynamid Node (1, 0, 1) for a value of Compensation_Carryover_Threshold=2 (refer Dynamid math depicted in Table 17)

TABLE 21

Sample Default Compensation Calculation

| | |
|---|---|
| L0 - (1, 0, 1) | $9.27 (no parents to this node, so no deductions) |
| L1 - (2, 1, 1) (2, 1, 2) (2, 1, 3) | $9.27 × 0.3 × 3 = $8.35 |
| L2 - (3, 1, 1) . . . (3, 3, 3) | $9.27 × 0.2 × 9 = $16.69 |
| Total: | $34.31 |

For the values of 'Percent_Carryover_L1'=30 and 'Percent_Carryover_L2'=20, default compensation for the subscriber (S1) with Dynamid node representation (1, 0, 1) is calculated as shown.

TABLE 22

Subscriber Compensation

| | |
|---|---|
| SUB 1 | $34.31 |
| T | $34.31 |
| S | $29.68 |
| SUB 2 | $27.82 |
| J | $27.82 |
| . . . | . . . |

TABLE 22-continued

Subscriber Compensation

| | |
|---|---|
| SUB 52 | $4.63 |
| SUB 53 | $4.63 |

Step 8 (214): Apply Dynamid rules and calculate penalties.

| | |
|---|---|
| Required input: | TNPI values for each subscriber in the IP distribution,<br>Penalty calculation rules,<br>Penalty quantum from Proxy Policy-set. |
| Process: | TNPI values represent local performance of the subscribers in defined neighborhood on a normalized and bounded scale and hence can be compared. A positive value of<br>$d = TNPI(X) - TNPI(X + 1)$<br>implies X + 1 is responsible for bringing down the average IP value in the neighborhood and is penalized. The greater the difference, the greater the penalty. Similarly, if the value is negative, X is penalized based on the magnitude of difference. Thus, based on the magnitude of difference between the TNPI values of consecutive neighbors, penalties for each subscriber are derived in this step. Note that the penalties are calculated but not applied in this step.<br>A sample penalty rule set is depicted in Table 23 which is used for the case study purpose. The rules (ranges) are empirically arrived at and are dependent on the way TNPI values are calculated (the functions used to normalize and transform NPI values). These may be fine tuned as more and more data becomes available. Note the value $TNPI(X) - TNPI(X + 1)$ is bounded by (−2, 2). |
| Output: | Penalties calculated for all the subscribers |

TABLE 23

Penalty Calculation Rules

| Sl. No. | Condition | Consequence | Penalty Magnitude |
|---|---|---|---|
| 1 | −2 < d <= −1.5 | Penalize X | 4 × NEG_PENALTY |
| 2 | −1.5 < d <= −1 | Penalize X | 3 × NEG_PENALTY |
| 3 | −1 < d <= −0.5 | Penalize X | 2 × NEG_PENALTY |
| 4 | −0.5 < d <= −0.2 | Penalize X | 1 × NEG_PENALTY |
| 5 | −0.2 < d <= −0.05 | DO NOTHING | NONE |
| 6 | −0.05 < d <= 0.05 | Make (x + 1) on par with x (if already not) | Average out |
| 8 | 0.05 < d <= 0.2 | DO NOTHING | NONE |
| 9 | 0.2 < d <= 0.5 | Penalize (X + 1) and cascade penalty in that level. | 1 × POS_PENALTY |
| 10 | 0.5 < d < 1 | Penalize (X + 1) and cascade penalty in that level. | 2 × POS_PENALTY |
| 11 | 1 < d < 1.5 | Penalize (X + 1) and cascade penalty in that level. | 3 × POS_PENALTY |
| 12 | 1.5 < d < 2 | Penalize (X + 1) and cascade penalty in that level. | 4 × POS_PENALTY |

Note that in case of a negative difference, only X is penalized whereas the penalty is cascaded from X+1 downwards in that depth level when the difference is positive.

Case Study: Step 8

| | |
|---|---|
| Input: | TNPI values - [(1, 0.8846), (2, 0.4926), (3, −0.4703), (4, −0.2084), (5, 0.2569), (6, −0.7189) . . . (69, −0.9994)]<br>PENALTY_QUANTUM_NEGATIVE = −0.5 (of L1)<br>PENALTY_QUANTUM_POSITIVE = 0.5 (of L1)<br>Penalty calculation rules. Refer Table 23 |

-continued

| | |
|---|---|
| Process: | Calculate d = TNPI(X) − TNPI(X + 1) for each subscriber where X is the rank.<br>For each subscriber, identify the rule applicable from rule table based on the value 'd' and identify respective penalty magnitudes. |
| Output: | Calculate penalties for all the subscribers. Refer Table 24. |

TABLE 24

Case Study Penalty Calculations

| | |
|---|---|
| SUB 1 | 0 |
| T | 0 |
| S | −0.5 |

TABLE 24-continued

Case Study Penalty Calculations

| | |
|---|---|
| SUB 2 | −0.5 |
| J | 1 |
| ... | ... |
| SUB 52 | 0 |
| SUB 53 | 0 |

Step 9 (216): Accomplish Micro-Level justification—Apply Penalties using chosen strategy

| | |
|---|---|
| Required input: | Penalties calculated for each subscriber in the IP distribution, Strategy details from Proxy's Policy-Set - MICRO_JUSTIFICATION_STRATEGY, BHU_PERCENT, MAX_PENALTY_FACTOR and MIN_COMPENSATION_FACTOR |
| Process: | Based on number of children in the Child Dynamid of a given node X, compensation penalty to be applied is normalized for each subscriber using the following formula (Rationale - Penalty applied to subscriber with more default compensation to be more than that applied to a subscriber, say, in the bottom most level with no children when the penalty magnitude identified in the previous section is same for both) -<br>normalizedPenaltyFactor(x) = MAX_PENALTY_FACTOR × (ChildCount(x) − Min_Child_Count) + (Max_Child_Count − ChildCount(x))/(Max_Child_Count − Min_Child_Count) where Max_Child_Count and Min_Child_Count are maximum and minimum child count of subscribers in the entire IP distribution. Then actual compensation penalty for each subscriber is calculated using the following formulae -<br>CompensationPenalty (x) = |normalizedPenaltyFactor(x) × [Penalty(x) × BaseCompensation × PERCENT_CARRYOVER_L1]|<br>where [Penalty(x) × BaseCompensation × PERCENT_CARRYOVER_L1] is nothing but the penalty magnitude calculated in the previous step multiplied by L1 worth.<br>Absolute value of CompensationPenalty (x) is the amount to be deducted from the Default Compensation value for each subscriber (calculated in step 7). While deducting the CompensationPenalty (x), it must be ensured that none of the subscribers get less than (MIN_COMPENSATION_FACTOR × BaseCompensation)<br>Penalty deductions are made; what remains is to distribute the 'Penalty Account' [ΣCompensationPenalty(x)] back to the IP distribution following micro-justification strategy of the Proxy from its Policy-Set. Possible strategies are BHU (Benefit Higher Ups), BLD (Benefit Lower Downs), BAL (Balanced) and % BHU (Partly BHU).<br>If MICRO_JUSTIFICATION_STRATEGY = "BHU", CompensationPenalty(x) value of each subscriber is divided equally between all the entities in the subscriber's parent hierarchy.<br>If MICRO_JUSTIFICATION_STRATEGY = "BAL", The entire penalty account is divided equally among all the subscribers in the IP distribution.<br>If MICRO_JUSTIFICATION_STRATEGY = "BLD", Penalty account is divided between all the depth levels of the Dynamid frame in the proportion of<br>(Level X Number Of subscribers in the level)<br>and all the subscribers in a given level are equally credited with the penalty account component for that level.<br>If MICRO_JUSTIFICATION_STRATEGY = "% BHU", BHU_PERCENT of penalty account is distributed using BHU strategy and the rest using BAL strategy. If BHU_Percent = 100, this is same as BHU and if BHU_Percent = 0, this is same as BAL strategy.<br>Note: BLD strategy is mentioned here as yet another option but it practically has no utility in online marketplace context as by rule 'lower downs' are heavy in any Dynamid frame and the benefit gets distributed so much so that it does not look like benefit to any of the users. On the other hand, BHU is likely to leave majority of the users dissatisfied (much like classical MLM pyramids). Best bet is % BHU strategy, on the marketplace. |
| Output: | Compensation for all the subscribers calculated using the strategy specified in the Proxy Policy-Set. Micro-justification is accomplished. |

Case Study: Step 9

| Input: | Penalties calculated for each subscriber in the IP distribution, Refer Table 24. MICRO_JUSTIFICATION_STRATEGY = "% BHU" BHU_PERCENT = 50 MINIMUM_COMPENSATION_FACTOR = 0.4 MAXIMUM_PENALTY_FACTOR = 3.0 |
|---|---|
| Process: | Compensation Penalty (x) for each subscriber is calculated ensuring none of the subscribers get less than (MIN_COMPENSATION_FACTOR × BaseCompensation) = 0.4 × $9.27 = $3.70 % BHU strategy is then applied to distribute the penalty kitty back to the IP distribution |
| Output: | Compensation calculated for all subscribers factoring in penalties and micro-justification strategy. Refer Table 25. |

TABLE 25

Case Study Compensation Distribution Using (50) % BHU Strategy

| SUB 1 | 53.99 |
|---|---|
| T | 57.43 |
| S | 29.51 |
| SUB 2 | 27.22 |
| J | 28.71 |
| ... | ... |
| SUB 52 | 4.66 |
| SUB 53 | 4.66 |

Note: The compensation distribution in Table 25 has anomalies as a subscriber with lower IP values is paid more in certain cases. For example, T with IP value 64 is paid $57.43 while SUB1 with IP value of 68 is paid $53.99. This result is expected as the penalties are applied and the penalty account was credited back to the subscriber base considering Dynamid node parentage alone and not considering subscriber rank/s. These anomalies are addressed in the next and final step.

Step 10 (218): Accomplish final justification—Sanitize compensation distribution

| Required input: | Micro-justified compensation distribution to the subscribers. |
|---|---|
| Process: | Compensation distribution is scanned from top to bottom checking for any anomalies; if encountered the compensation is averaged out to ensure no high ranked subscriber gets any less compensation than his/her successor. This step involves sharing child nodes between dynamid nodes that have near equal IP performance ratings. |
| Output: | Sanitized compensation distribution. |

Case Study: Step 10

| Input: | Penalties calculated for each subscriber in the IP distribution, Refer Table 25. |
|---|---|
| Process: | Sample: Compensation(1) [53.99] < Compensation(2) [57.43] Hence, SanitizedCompensation(1) = SanitizedCompensation(2) = [Compensation(1) + Compensation(2)]/2 = 53.99 + 57.43/2 = 55.71 |
| Output: | Sanitized compensation calculated for all subscribers. Refer Table 26. |

TABLE 26

Case Study Sanitized Final Compensation Distribution using (50) % BHU strategy

| SUB 1 | $55.71 |
|---|---|
| T | $55.71 |
| S | $29.51 |
| SUB 2 | $27.96 |
| J | $27.96 |
| ... | ... |
| SUB 52 | $ 4.66 |
| SUB 53 | $ 4.66 |

Having shown and described a preferred embodiment of the present invention, those skilled in the art will realize that many variations and modifications may be made to the described invention and still be within the scope of the claimed invention. Thus many of the elements indicated above may be altered or replaced by different elements which will provide the same or substantially the same result and fall within the spirit of the claimed invention. It is the intention therefore to limit the invention only as indicated by the scope of the claims. Therefore, as can be understood from a review of the foregoing discussion and accompanying drawing figures, the present invention is broadly directed to an online marketplace that facilitates initiation and operation of online businesses. Consequently, while certain exemplary embodiments of the present invention are described in detail above, the scope of the invention is not to be considered limited by such disclosure, and modifications are possible without departing from the spirit of the invention as evidenced by the following claims:

What is claimed is:

1. A computerized method for enabling business initiation and operation comprising:
   at a computer server:
   (A) initiating at an online site at said computer server a proxy entity corresponding to said business;
   (B) creating for said business proxy entity a policy set comprising:
      (1) a description of said business;
      (2) a plurality of permissible investment type actions for facilitating subscriber investments in said business proxy;
      (3) proxy commission percentages corresponding to each of the products or services offered by said business proxy;
      (4) a mapping of investment points to each of said plurality of investment type actions for allotting investment points to subscribers according to their investment type actions;
      (5) a set of rules governing said investment point allotment to subscribers;
      (6) a definition of compensation to said subscribers against their respective investment points earned as consequence of their investment type actions;
      (7) a business cycle definition describing conditions for executing investment point settlement to compensate said subscribers; and
      (8) a set of parameters to an investment point settlement algorithm;
   (C) receiving from a plurality of subscribers a commitment to invest in said business proxy, each commitment comprising at least:
      (1) an investment type action; or
      (2) an investment amount;

(D) allotting investment points to each of said subscribers as defined in said policy set for said subscriber's investment type actions or amount; and (E) at completion of each business cycle, executing said investment point settlement algorithm with said parameters to calculate for each subscriber a monetary equivalent to investment points earned during said business cycle.

2. The computerized method of claim 1 wherein said plurality of investment type actions are selected from the group consisting of:

equity investments types and proxy equity investment types.

3. The computerized method of claim 2 wherein said equity investment type actions are selected from the group consisting of:

direct monetary investments and indirect monetary investments.

4. The computerized method of claim 3 wherein said indirect monetary investments comprise skill based services provided to said business proxy resulting in equity stakes in said business proxy.

5. The computerized method of claim 2 wherein said proxy equity investment types are selected from the group consisting of:

(1) writing a review of said business proxy;
(2) writing a review of products or services offered by said business proxy;
(3) providing direct or indirect referrals to said business proxy;
(4) blogging a topic related to said business proxy;
(5) providing at a website a link to said business proxy;
(6) publishing content on a website related to said business proxy;
(7) publishing content on a website related to products or services of said business proxy;
(8) purchasing a product or service of said business proxy;
(9) committing to purchase a product or service of said business proxy before said business proxy is initiated;
(10) committing to purchase a product or service of said business proxy at a later time; and
(11) online or offline activities providing visibility to said business proxy.

6. The computerized method of claim 1 wherein receiving from a plurality of subscribers a commitment to invest in said business proxy comprises receiving a commitment to invest prior to initiation of said business proxy.

7. The computerized method of claim 1 wherein allotting investment points to said plurality of subscribers against investment type actions comprises allotting proxy equity stakes prior to initiation of said business proxy.

8. The computerized method of claim 1 wherein said business is selected from the group consisting of:

(1) businesses that are fully online;
(2) businesses that operate partly online; and
(3) businesses that do not operate online.

9. The computerized method of claim 1 wherein said subscribers are selected from the group consisting of:

(1) an investor or a proxy subscriber who is an individual;
(2) an investor or a proxy subscriber who is a business proxy; and
(3) an investor or a proxy subscriber who is a project proxy.

10. The computerized method of claim 5 wherein said reviews are selected from the group consisting of:

(1) free-text reviews of said business proxy or of products and services offered thereof;
(2) quantitative ratings of said business proxy or of products and services offered thereof; and
(3) expressing interest or opinion on said business proxy or on products and services offered thereof.

* * * * *